(12) United States Patent
Park et al.

(10) Patent No.: US 12,032,923 B2
(45) Date of Patent: Jul. 9, 2024

(54) ELECTRONIC DEVICE AND METHOD FOR TRANSLATING LANGUAGE

(71) Applicant: Samsung Electronics Co., Ltd., Suwon-si (KR)

(72) Inventors: Sangmin Park, Suwon-si (KR); Gajin Song, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 17/476,005

(22) Filed: Sep. 15, 2021

(65) Prior Publication Data

US 2022/0012436 A1 Jan. 13, 2022

Related U.S. Application Data

(63) Continuation of application No. PCT/KR2021/008412, filed on Jul. 2, 2021.

(30) Foreign Application Priority Data

Jul. 9, 2020 (KR) .................. 10-2020-0084968

(51) Int. Cl.
*G06F 40/58* (2020.01)
(52) U.S. Cl.
CPC .................. *G06F 40/58* (2020.01)
(58) Field of Classification Search
None
See application file for complete search history.

(56) References Cited

U.S. PATENT DOCUMENTS

| 7,778,632 B2 * | 8/2010 | Kurlander ......... H04M 1/72457 455/66.1 |
| 2013/0226556 A1 | 8/2013 | Hwang et al. |
| 2019/0114322 A1 | 4/2019 | Huang |

FOREIGN PATENT DOCUMENTS

| CN | 107844470 A | 3/2018 |
| CN | 110210029 A | 9/2019 |
| KR | 10-2006-0101624 A | 9/2006 |
| KR | 10-1052279 B1 | 7/2011 |
| KR | 10-2012-0048104 A | 5/2012 |
| KR | 10-1478282 B1 | 1/2015 |
| KR | 10-1914916 B1 | 6/2017 |
| KR | 10-1753649 B1 | 7/2017 |
| KR | 10-2019-0041147 A | 4/2019 |
| KR | 10-2019-0053028 A | 5/2019 |
| KR | 10-2020-0069727 A | 6/2020 |

OTHER PUBLICATIONS

Xie, Neural Text Generation: A Practical Guide, https://cs.stanford.edu/~zxie/textgen.pdf, Mar. 22, 2018.
International Search Report dated Oct. 22, 2021, issued in International Patent Application No. PCT/KR2021/008412.

* cited by examiner

*Primary Examiner* — Quynh H Nguyen
(74) *Attorney, Agent, or Firm* — Jefferson IP Law, LLP

(57) ABSTRACT

An electronic device is provided. The electronic device includes one or more sensors, a display device, and a processor, wherein the processor may be configured to control receiving an input, control translating the input based on at least one of a surroundings factor or a translation factor, and control providing a translation result based on at least one of the surroundings factor or the translation factor.

13 Claims, 21 Drawing Sheets

ELECTRONIC DEVICE AND METHOD FOR TRANSLATING LANGUAGE

CROSS-REFERENCE TO RELATED APPLICATION(S)

This application is a continuation application, claiming priority under § 365(c), of an International application No. PCT/KR2021/008412, filed on Jul. 2, 2021, which is based on and claims the benefit of a Korean patent application number 10-2020-0084968, filed on Jul. 9, 2020, in the Korean Intellectual Property Office, the disclosure of which is incorporated by reference herein in its entirety.

TECHNICAL FIELD

The disclosure relates to a method for translating a language and an electronic device.

BACKGROUND ART

With the advancement of technology, translations can be supported by electronic devices. A user can install a translation-related application in an electronic device and use it. For example, when a user installs a translation application for a corresponding country before going on a trip, the user can use the application to talk with people of other countries and purchase products.

The above information is presented as background information only to assist with an understanding of the disclosure. No determination has been made, and no assertion is made, as to whether any of the above might be applicable as prior art with regard to the disclosure.

DISCLOSURE

Technical Problem

In translation, when translating homophones or polysemous words, if the usage environment and/or the conversation environment are not taken into account, it is possible to provide a result that is not suitable for the user's intent or is not accurate.

Aspects of the disclosure are to address at least the above-mentioned problems and/or disadvantages and to provide at least the advantages described below. Accordingly, an aspect of the disclosure is to provide a method for translating a language and an electronic device including the method according to various embodiments of the disclosure to provide a translation intended by the user by limiting the domain and the meaning of a word when performing language translation.

Another aspect of the disclosure is to provide a method for translating a language and an electronic device including the method according to various embodiments of the disclosure to provide a translation intended by the user by limiting the meaning of a word based on information about the surrounding environment of the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes one or more sensors, a display device, and a processor, wherein the processor may be configured to control receiving an input, control translating the input based on at least one of a surroundings factor or a translation factor, and control providing a translation result based on at least one of the surroundings factor or the translation factor.

In accordance with another aspect of the disclosure, a method for language translation is provided. The method includes controlling receiving an input, translating the input based on at least one of a surroundings factor or a translation factor, and providing a translation result based on at least one of the surroundings factor or the translation factor.

Advantageous Effects

The electronic device and the method for translating a language according to various embodiments of the disclosure can provide a translation result intended by the user in a short time by performing translation while limiting the domain and the meaning of a word.

The electronic device and the method for translating a language according to various embodiments of the disclosure can modify the translation result as intended by the user by performing translation while limiting the domain and the meaning of a word.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
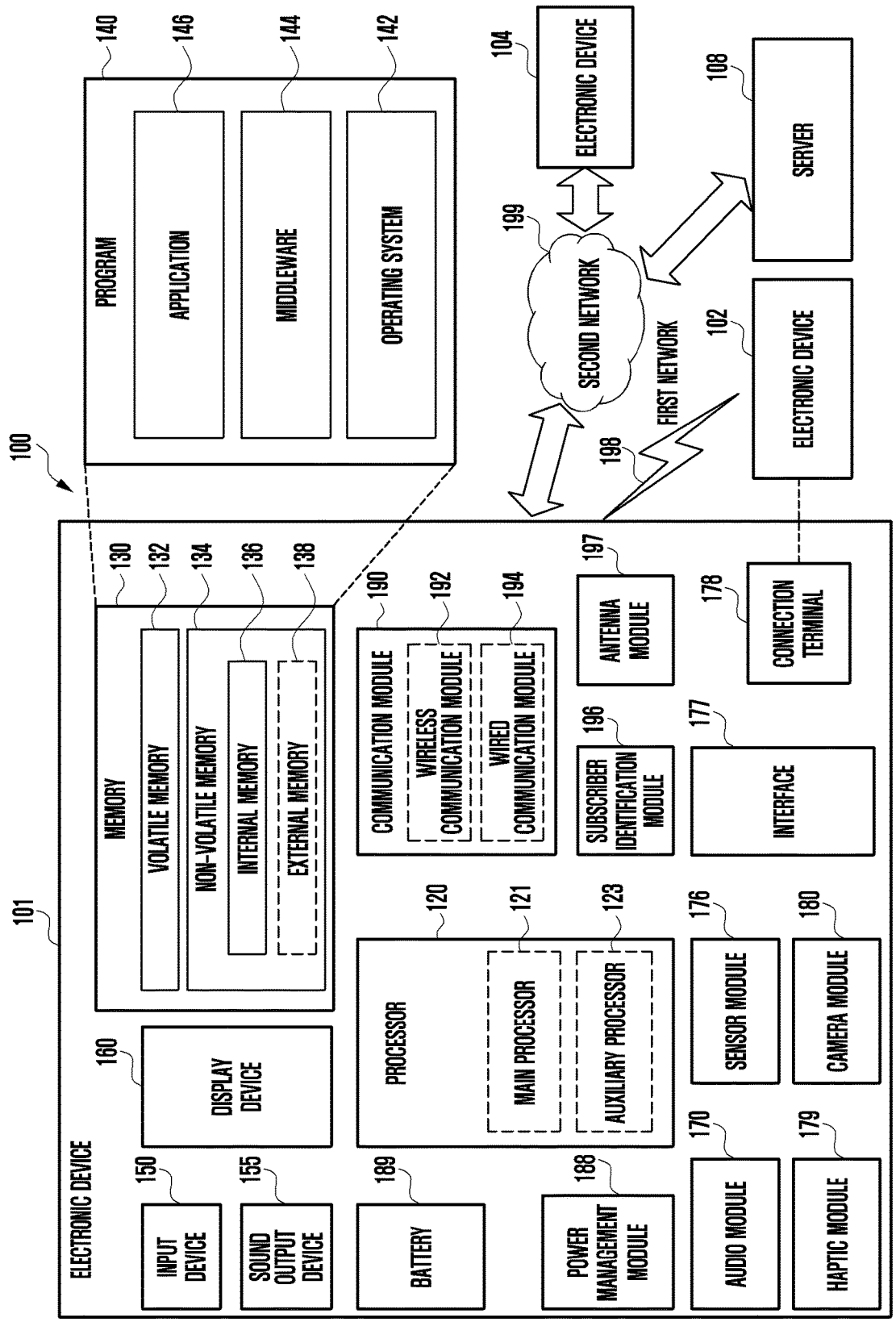
FIG. 1 is a block diagram of an electronic device in a network environment according to an embodiment of the disclosure.

FIG. 1 is a block diagram illustrating an electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display device 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
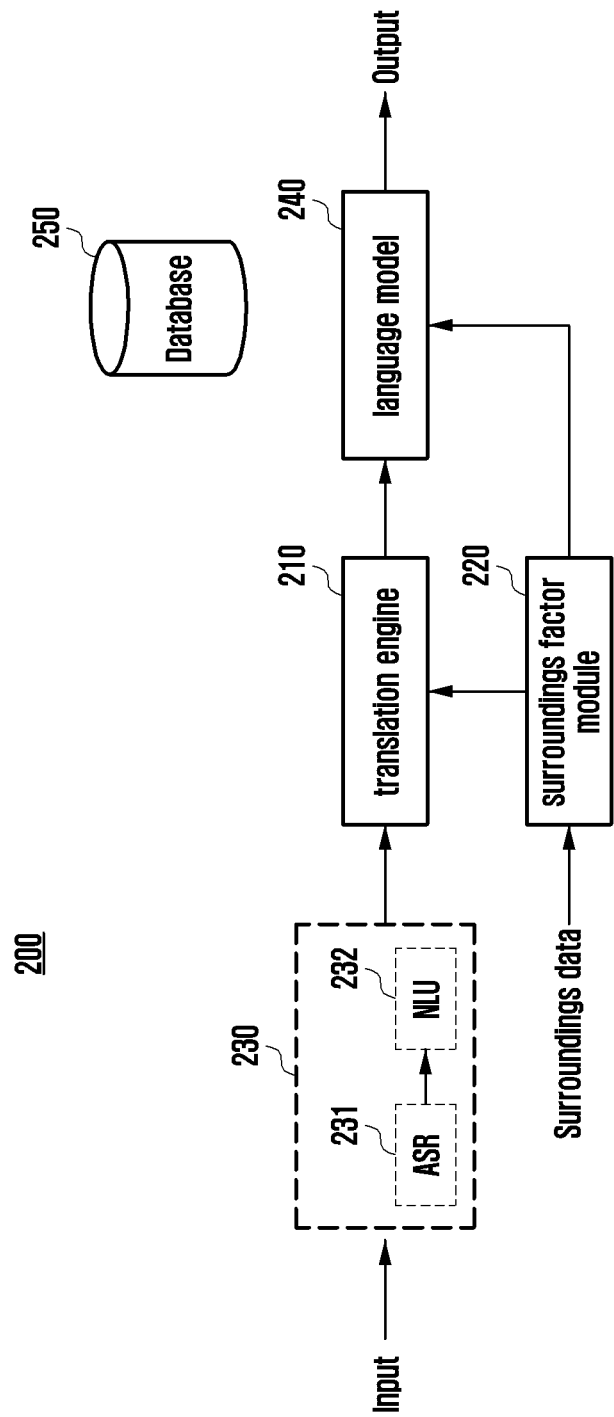
FIG. 2 is a diagram showing a translation system according to an embodiment of the disclosure.

FIG. 2 is a diagram showing a translation system according to an embodiment of the disclosure.

Referring to FIG. 2, in various embodiments, a translation system 200 may include a translation engine 210, a surroundings factor module 220, an input recognition module 230, a language model 240, and a database 250.

In various embodiments, the translation engine 210, the surroundings factor module 220, the input recognition module 230, the language model 240 and/or the database 250 included in the translation system 200 may be stored as software including instructions in the memory (e.g., memory 130 in FIG. 1) of the electronic device (e.g., electronic device 101 in FIG. 1), and may be executed under the control of the processor (e.g., processor 120 in FIG. 1). The processor 120 may include a hardware structure specialized for processing an artificial intelligence model.

In various embodiments, the translation engine 210, the surroundings factor module 220, the input recognition module 230, the language model 240 and/or the database 250 may be a system and/or program embedded in the processor 120 of the electronic device 101.

In various embodiments, at least some of the translation engine 210, the surroundings factor module 220, the input recognition module 230, the language model 240 and/or the database 250 may be stored in the memory 130 of the electronic device 101, and the others may be stored in the memory (not shown) of a server (e.g., server 108 in FIG. 1) capable of communicating with the electronic device 101.

In various embodiments, the server 108 may store at least some of the translation engine 210, the surroundings factor module 220, the input recognition module 230, the language model 240 and/or the database 250 as software in the memory (not shown), and may execute them under the control of the processor (not shown).

In various embodiments, at least some of the translation engine 210, the surroundings factor module 220, the input recognition module 230, the language model 240 and/or the database 250 may be a system and/or program embedded in the processor 120 of the electronic device 101.

In various embodiments, the electronic device 101 may store (or install) a translation application. The translation application may include a translation-only application and/or a virtual assistant application. For example, the translation-only application may be an application for providing only a translation (or interpretation) service (e.g., Google Translate). The virtual assistant application may be an application for providing various functions (e.g., Bixby). For example, the virtual assistant service may provide various services such as schedule management, application control, translation (or interpretation), and information retrieval. The virtual assistant service may provide a translation service by receiving a request for executing a translation service from a user. Hereinafter, in various embodiments, for ease of description, a virtual assistant application and a translation-only application are mainly described as an example of a translation application, but the translation application is not limited thereto. For example, those skilled in the art will readily understand that various embodiments of the disclosure can be applied to a web browser (e.g., Google Chrome) capable of displaying a web page providing a translation service.

In various embodiments, when the translation application is executed, the electronic device 101 may receive a user input related to the translation application (hereinafter, "user input") through the input module (e.g., input device 150 in FIG. 1) and/or the display device 160.

In various embodiments, the user input may include an utterance input and/or text input.

For example, the electronic device 101 may receive a user's utterance input by using a microphone (mic) included in the input module (e.g., input device 150 in FIG. 1).

For example, the electronic device 101 may receive a text input through a virtual keypad displayed on the display device (e.g., display device 160 in FIG. 1), handwriting recognition via the display device 160, and/or a physical key input.

In various embodiments, the inputted user input may be transferred to the input recognition module 230 or the translation engine 210.

In various embodiments, the input recognition module 230 may include an automatic speech recognition (ASR) 231 and a natural language understanding (NLU) module 232. The translation system 200 may not include at least a portion of the input recognition module 230. For example, a user text input entered in a source language input interface (e.g., text input box) provided by a translation-only application may be transmitted to the translation engine 210. Since it is clear that a user utterance input entered through the translation-only application is an utterance input for translation, it may be transmitted to the translation engine 210 only through the automatic speech recognition 231. As another example, a user utterance input entered through a virtual assistant may be transmitted to the translation engine 210 through both the automatic speech recognition 231 and the natural language understanding module 232. The translation system 200 may selectively or additionally include the input recognition module 230 accordingly.

In various embodiments, the automatic speech recognition 231 may convert an utterance input into text data. The automatic speech recognition 231 may convert an utterance input into text data and transmit it to the natural language understanding module 232.

In various embodiments, the natural language understanding module 232 may divide the text data into small units for extraction based on a specific condition (e.g., division by word), and may extract (or, generate) intents and parameters by inferring the context from the extracted words. The natural language understanding module 232 may transmit the extracted intents and parameters to the translation engine 210. In various embodiments, the intent may refer to an operation to be performed by the electronic device 101 (or, the server 108), and the parameter may refer to a factor required when performing the corresponding operation. For example, the natural language understanding module 352 may receive text data (e.g., "화장실이 어디에요를 영어로 번역해줘") from the automatic speech recognition 231, divide it into words such as 화장실 ', ([hwajangsil])', 이 ([i])', 어디에요 ([eodieyo])', 를 ([leul])', 영어 ([yeong-eo])', 로 ([lo])', 번역 ([beon-yeog])', 해 ([hae])', 줘 ([jwo])', determine "performing a translation operation" as the intent, and determine 화장실이 어디에요 ([hwajangsil-i eodieyo])' and 영어로 ([yeong-eolo])' as parameters for the translation operation. The parameter may include translation text data for performing translation (or, target for translation). For example, 화장실이 어디에요 may be translation text data.

In various embodiments, the surroundings factor module 220 may receive surroundings data collected through at least one of a camera (e.g., camera module 180 in FIG. 1), a microphone (e.g., input device 150 in FIG. 1), one or more sensors (e.g., sensor module 176 in FIG. 1), and/or a communication module (e.g., communication module 190 in FIG. 1) included in the electronic device 101, and may generate (or, select) a surroundings factor corresponding to the surroundings data. The surroundings factor module 220 may transmit the generated surroundings factor to the translation engine 210 and/or the language model 240.

In various embodiments, the surroundings data may include various types of information. For example, the surroundings data may include image information obtained by the camera module 180 of the electronic device 101 from the outside of the electronic device 101 or image analysis data obtained by analyzing an image. The surroundings data may include external acoustic information collected through the microphone of the electronic device 101 or acoustic analysis data obtained by analyzing external acoustic information. The surroundings data may include location information (e.g., GPS data, base station information) collected through the communication module 190. The surroundings data may include information (e.g., point of interest (POI)) received from an external server (e.g., server 108 in FIG. 1) through the communication module 190. The surroundings data is not limited to the above-described example.

In various embodiments, the surroundings factor module 220 may generate (or, select) a surroundings factor from the received surroundings data. The surroundings factor may indicate information that can be generated by analyzing and/or processing surroundings data and has a designated format (e.g., text data). The surroundings factor may be information selected from the database 250 based on surroundings data. Alternatively, when surroundings data is received in a designated format, the surroundings data may be selected as a surroundings factor. For example, when an image is obtained as surroundings data, a surroundings factor may be generated by analyzing the image. When a person is present in the image, information such as age and gender can be determined, and a surroundings factor can be generated based on the information. For example, the surroundings factor may be determined to be 'forties' and 'male' in a designated format. When the surroundings factor module 220 receives surroundings data (e.g., 'person', 'male', 'alone', 'forties', 'glasses') being image analysis, at least a portion of the received surroundings data may be determined to be a surroundings factor. As another example, when the surroundings factor module 220 receives location information (e.g., GPS coordinates value) as surroundings data, the surroundings factor may be determined by the received location or POI or may be generated based on a result of analyzing the received location information. For example, a surroundings factor may be generated from a location category (e.g., store, grocery, subway) in a designated format. As another example, when the surroundings factor module 220 receives audio information as surroundings data, the surroundings factor module 220 may determine the surroundings factor by analyzing the audio information. For instance, a surroundings factor may be determined by analyzing the background sound included in the audio data. For example, it is possible to determine a surroundings factor including a place such as subway or restaurant, and/or an activity type of the user (e.g., exercise, walking, running, driving).

In various embodiments, the surroundings factor module 220 may include an acoustic event detection (AED) module. The surroundings factor module 220 may extract acoustic features from an obtained ambient sound and generate an acoustic scene label for the obtained ambient sound by performing acoustic classification on the extracted acoustic features. Based on the acoustic scene label, the surroundings factor module 220 may generate a surroundings factor for information about the place where an utterance input and/or text input is detected, and the situation in which an utterance input and/or text input is detected. In various embodiments, the surroundings factor module 220 may generate a surroundings factor by analyzing surroundings data through machine learning and/or artificial neural networks.

In various embodiments, the surroundings factor module 220 may transmit the generated surroundings factor to the translation engine 210 and/or the language model 240. In one embodiment, when receiving a request message for a surroundings factor from the translation engine 210 and/or the language model 240, the surroundings factor module 220 may transfer the surroundings factor to the translation engine 210 and/or the language model 240. For example, when the translation engine 210 has to translate a word having plural meanings, it may transmit a request message for a surroundings factor to the surroundings factor module 220.

Examples of surroundings factors according to various embodiments are not limited to the above-described examples, and any information in a designated format (e.g., text, identifier) about the environment in which the translation is performed may be used as a surroundings factor.

In various embodiments, the translation engine 210 may translate text data (e.g., parameter for translation operation) input in a source language (or, start language) for translation into a target language (or, destination language). The source language and/or the target language may be determined based on user input. For example, a translation-only application may provide a user interface for designating a source language and a target language and use a source language and target language designated based on a user input.

Alternatively, the source language may be determined by the translation engine 210. The translation engine 210 may determine the source language by analyzing the received text data. The translation engine 210 may determine the target language based on a received parameter. For example, if the parameter includes 영어로 ([yeong-eolo])', the translation engine 210 may determine the target language as English. The method of determining the source language and the target language is not limited to the above-described embodiments.

In various embodiments, the translation engine 210 may translate polysemous words (or, homonymous words). For example, the translation engine 210 may detect a polysemous word among the words included in the text data to be translated. The translation engine 210 may identify a plurality of meanings for one word from the dictionary data (or, meaning data) included in the database 250. For example, when consulting dictionary data in English being the target language for '밤 ([bam])' in Korean being the source language, 'night' and 'chestnut' may be extracted. The translation engine 210 may determine '밤 ([bam])' having an extracted meaning of 'night' and '밤 ([bam])' having an extracted meaning of 'chestnut' as a word that is likely to be translated (hereinafter, "candidate word").

In various embodiments, the translation engine 210 may receive a surroundings factor from the surroundings factor module 220 and translate a polysemous word based on the received surroundings factor. In one embodiment, to analyze a plurality of candidate words, the translation engine 210 may determine (or, generate) at least one keyword based on the surroundings factor. The keyword may be, for example, a word used to analyze each of the plural candidate words. A keyword may be selected from keyword data or dictionary data based on a surroundings factor. Table 1 is an embodiment of keyword data.

TABLE 1

| Type of surroundings factor | Keyword 1 | Related keyword 1 | Related keyword 2 |
|---|---|---|---|
| POI | POI name | POI category | POI category related keyword |
| address | place name | place category | place category related keyword |
| user's gender | user's gender | gender category | gender related keyword |
| user's age | user's age | age category | age related keyword |

With reference to Table 1, for example, when the surroundings factor received by the translation engine 210 is POI information, for example, 'XXgrocery store', the translation engine 210 may determine, from the POI, a POI name itself 'XXgrocery store' or an edited POI name 'grocery store(' as a keyword. Or, the translation engine 210 may analyze POI information and determine a category 'grocery store' or 'mart' as a keyword. Additionally, it may further select keywords such as 'food' and 'shopping' related to the determined keyword. As another example, when the surroundings factor received by the translation engine 210 is address information, for example, 'Marine City 3-ro, Haeundae-gu, Busan', the translation engine 210 may determine a keyword such as 'Busan', 'Haeundae-gu' based on the surroundings factor. Additionally, the translation engine 210 may determine a place category such as 'coast' to be a keyword, as a category of the place corresponding to the address information. Or, when the surroundings factor received by the translation engine 210 is 'male' or 'forties', it may be determined as a keyword. Additionally, the translation engine 210 may determine a category corresponding to the determined keyword, such as gender or age, as a keyword. For example, when the age is 'under 10 years old', the age category may be determined as 'child'. The keywords determined based on surroundings factors may be identical (e.g., 'male', 'male'), and only one of them may be used. The translation engine 210 may further determine a keyword related to gender or age. For example, for 'male', a similar word such as 'man' may be further determined as a keyword. In various embodiments, the translation system 200 may include keyword category data and/or related keyword data for determining a keyword. The translation engine 210 may determine (or, analyze) the usage association of each of the plural candidate words based on the determined at least one keyword.

In various embodiments, the translation engine 210 may determine (or, analyze) the usage association between each of the determined at least one keyword and each of the plural candidate words. For example, when two keywords and two candidate words are determined, the translation engine 210 may determine four usage associations. For instance, when 밤 ([bam])' having a meaning of 'night' and 밤 ([bam])' having a meaning of 'chestnut' are determined as candidate words for 밤 ([bam])' in Korean, and 'XX grocery store' and 'food' are determined as keywords based on POI information being a surroundings factor, the translation engine 210 may determine the usage association between each keyword and each of 밤 ([bam])' having a meaning of 'night' and 밤 ([bam])' having a meaning of 'chestnut'.

In various embodiments, the usage association may be analyzed based on, for example, dictionary data stored in the database 250 and/or history data storing a history of languages used by users. The history data may include language usage histories classified based on age, gender, or place.

In various embodiments, the translation engine 210 may determine a candidate word related to the usage association having the highest value among the determined plural usage associations. For example, the usage association between 밤 ([bam])' having a meaning of 'chestnut' and keyword 'food' may have the highest value, and the usage association between 밤 ([bam])' having a meaning of 'chestnut' and keyword 'grocery store' may have the next highest value. For instance, the usage association between 밤 ([bam])' having a meaning of 'night' and keyword 'grocery store' may have the lowest value. In this case, the translation engine 210 may determine to translate 밤 ([bam])' having a meaning of 'chestnut' corresponding to the usage association having the highest value.

In various embodiments, the translation engine 210 may translate the candidate word determined to be translated. For example, 밤 ([bam])' being the candidate word determined to be translated may be translated into 'chestnut' in the target language. The translation engine 210 may transmit the translation result to the language model 240. According to various embodiments, the translation engine 210 may transmit a keyword selected in addition to the translation result to the language model 240. In various embodiments, the translation engine 210 may be unable to determine a candidate word to be translated among a plurality of candidate words. For example, if the electronic device 101 does not collect sufficient surroundings data, the electronic device 101 may be unable to determine a surroundings factor. As another example, although surroundings data is collected, if the usage association analysis using keywords and candidate words based on the surroundings data determines only values lower than the threshold (e.g., a threshold of 0.5 when the usage association has a maximum value of 1), the electronic device 101 may not determine the candidate word to be translated. In this case, the electronic device 101 may translate all the candidate words and provide them to the user. For example, in the case of 배 ([bae])', both 'ship' and 'pear' can be provided to the user. Among them, the electronic device 101 may display a translation result corresponding to the candidate word having the highest usage association at the top position, and may determine the translation result by receiving a user selection for one of translation results included in the list. The electronic device 101 may store the translation result selected by the user in the history data. For example, 'ship' selected by the user may be mapped to 배 ([bae])' in Korean being the source language and stored.

In various embodiments, the language model 240 may receive a translation result and apply language usage rules of the country or cultural area using the target language to the received translation result. For example, in the case of Asian countries, since honorific words are used separately, the language model 240 may update the translation result with honorific words. Or, for example, it may determine that the translation result conforms to the target language usage rules and output the translation result as it is.

In various embodiments, the language model 240 may receive a translation result and transform it to suit the usage environment. For example, a surroundings factor may be further received from the surroundings factor module 220 or a keyword may be further received from the translation engine 210. The language model 240 may transform a translation result based on a surroundings factor or a keyword. For example, the language model 240 may receive 'cataract' being a translation result corresponding to 백내장 ([baegnaejang])' in Korean being the source language and 'kid' being a keyword from the translation engine 210. The language model 240 may determine the difficulty level of the translation result based on the keyword 'kid'. For example, the language model 240 may determine the difficulty level based on dictionary data and/or history data included in the database 250. For instance, the dictionary data and/or history data may include a classification system (or, taxonomy) of words, and the taxonomy associated with 'cataract' being a translation result of 백내장 in the source language may include 'eye disease' being 눈 병 and 'disease' being '질병'. The language model 240 may update, based on the keyword 'kid', the translation result with 'eye disease' having a history associated with 'kid'. According to various embodiments, there is no limitation on how the language model 240 updates the translation result.

In various embodiments, the language model 240 may output a translation result. When outputting the translation result, it can be output in speech and/or text. To output the translation result in speech, the language model 240 may further include a speech synthesis module (text to speech (TTS)).

In various embodiments, the database 250 may be stored in the memory (e.g., memory 130 in FIG. 1) of the electronic device 101 or the memory (not shown) of the server 108. The database 250 may include data for the operation of the translation system 200. For example, the database 250 may include at least one of, but not limited to, surroundings factor data, dictionary data, keyword data, keyword category data, related keyword data, or history data, and those skilled in the art will readily understand that the database 250 may include various data used in the translation operation of the translation system 200.

Figure 3:
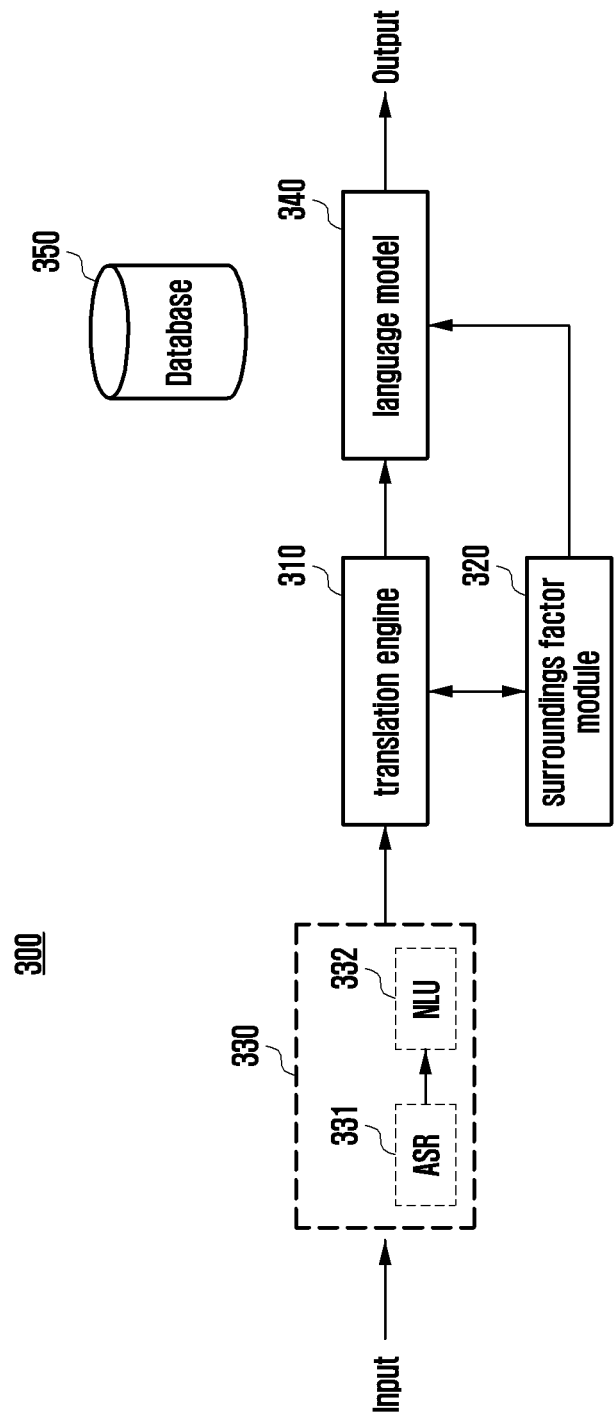
FIG. 3 is a diagram showing a translation system according to an embodiment of the disclosure.

FIG. 3 is a diagram showing a translation system according to an embodiment of the disclosure.

Referring to FIG. 3, in various embodiments, a translation system 300 may include a translation engine 310, a translation factor module 320, an input recognition module 330, a language model 340, and/or a database 350. The input recognition module 330 and the language model 340 included in the translation system 300 of FIG. 3 may be identical or similar to the input recognition module 230 and the language model 240 included in the translation system 200 of FIG. 2. Among the configurations included in the translation system 300, the characteristics or operations of the configuration described in the translation system 200 of FIG. 2 are omitted or simplified.

In various embodiments, the translation factor module 320 may receive text data from the input recognition module 330. For example, the text data may include text data for translation operation among the user utterance input converted into text through the ASR 331 and/or the NLU 332.

In various embodiments, the translation factor module 320 may extract a translation factor from the received text data. The translation factor may mean a modifier for limiting the meaning of a word to be translated, not a word to be translated. For example, if the word to be translated is a polysemous word (or, homophone) having a plurality of meanings, a modifier used to limit the meaning of the word may be extracted as a translation factor.

In various embodiments, the translation factor module 320 may include a pre-processing method and/or a post-processing method. The pre-processing method may be an operation of identifying a limiting modifier that limits the meaning of the translation target and separating the limiting modifier from the text data. The post-processing method may be an operation of removing a limiting modifier from the target language and/or the translation target. For example, if the user enters an utterance in Korean "아삭아삭 배가 영어로 뭐야?([asag-asag baega yeong-eolo mwoya]?)", the pre-processing method may extract a limiting modifier that limits the meaning from the utterance. In the above example, the limiting modifier "아삭아삭 ([asag-asag])" is not actually reflected in the final translation result, but it may be said to be a limiting modifier that clarifies the meaning of the word "배 ([bae])" to be translated. In the pre-processing method, such a limiting modifier can be extracted from the user's utterance. Also, it may be not used in translation.

As another example, in the case of translating a user's utterance into the language of the final result, it may be determined that a limiting modifier in the final result does not belong to the part requested by the user for translation, and post-processing may be performed to remove it. For instance, instead of translating "아삭아삭 배 ([asag-asag bae])" into "crispy pear", the limiting modifier "crispy" may be removed through post-processing and "pear" may be output as the final result.

In various embodiments, the pre-processing method included in the translation factor module 320 may be a method of explicitly receiving a limiting condition such as a limiting modifier. For example, the pre-processing method may be a conditional transformer language model.

In various embodiments, the translation engine 310 may determine (or, analyze) the usage association based on a statistical probability for a word and/or sentence to be translated according to the translation factor received from the translation factor module 320.

In various embodiments, the translation engine 310 may determine (or, analyze) the usage association of each of plural candidate words based on a translation factor (e.g., limiting modifier). For example, when two candidate words are determined, the translation engine 210 may determine two usage associations. For instance, for '배 ([bae])' in Korean, both '배 ([bae])' having a meaning of 'ship' and '배 ([bae])' having a meaning of 'pear' can be determined as candidate words.

In various embodiments, the usage association may be analyzed based on, for example, dictionary data and/or history data storing a history of languages used by users stored in the database 350. The history data may include histories of language usage classified based on age, gender, or place.

In various embodiments, the translation engine 310 may determine a candidate word related to the usage association having the highest value among the determined plural usage associations.

For example, the translation engine 310 may determine (or analyze) the usage association for each of candidate words '배 ([bae])' having a meaning of 'boat' and '배 ([bae])' having a meaning of 'paer' for "배 ([bae])" to be translated can be translated, based on a statistical probability. If the usage association between '먹는 (eating)' and '배 ([bae])' having a meaning of 'boat' is 0.3, and the usage association between '먹는 (eating)' and '배 ([bae])' having a meaning of 'pear' is 0.7, the translation engine 310 may output 'pear' as a translation for 배 ([bae])'.

In various embodiments, the translation engine 310 may translate a candidate word determined to be translated. For example, 배 ([bae])' being a candidate word determined to be translated may be translated into 'pear' in the target language.

In various embodiments, the translation engine 210 may be unable to determine a candidate word to be translated among a plurality of candidate words. For example, if the usage association analyzed using candidate words determines only values lower than the threshold (e.g., a threshold of 0.5 when the usage association has a maximum value of 1), the electronic device 101 may not determine the candidate word to be translated. In this case, the electronic device 101 may translate all the candidate words and provide them to the user. For example, in the case of '배 ([bae])', both 'ship' and 'pear' can be provided to the user. Among them, the electronic device 101 may display a translation result corresponding to the candidate word having the highest usage association at the top position, and may determine the translation result by receiving a user selection for one of translation results included in the list. The electronic device 101 may store the translation result selected by the user in the history data. For example, 'ship' selected by the user may be mapped to '배 ([bae])' in Korean being the source language and stored. In various embodiments, the translation engine 310 may select "pear" as a translation for "배 ([bae])", and translate "아삭아삭 배" into "crispy pear" according to the contents of the user's utterance input. Here, the translation engine 310 may remove "crispy" limiting the meaning of the translation target by using the post-processing method after determining that the user did not intend to translate it, and may output "pear" as a translation result for "아삭아삭 배가 영어로 뭐야?([asag-asag baega yeong-eolo mwoya]?)". In various embodiments, the post-processing operation of the translation engine 310 may be performed in the language model 340.

In various embodiments, the translation engine 310 may select "pear" as a translation for "배 ([bae])", and translate "아삭아삭 배" into "crispy pear" according to the contents of the user's utterance input. Here, the translation engine 310 may remove "crispy" limiting the meaning of the translation target by using the pre-processing method after determining that the user did not intend to translate it, and may output "pear" as a final translation result for "아삭아삭 배가 영어로 뭐야?([asag-asag baega yeong-eolo mwoya]?)" after excluding a limiting modifier from translation and performing translation on the parts to be actually translated. In various embodiments, the pre-processing operation of the translation engine 310 may be performed in the language model 340. It is also possible to use the pre-processing operation and the post-processing operation together. In various embodiments, the translation engine 310, as a statistics-based translation, may analyze a correlation based on data included in the learning data, and perform the most similar type of translation.

In various embodiments, the translation system 300 may express by removing a modifier that limits the meaning of the translation target using a post-processing method. The language model 340 may transform the form of the post-processed translated text and/or the translated word by using a decoder including a constraint (e.g., constrained decoder). The constrained decoder may be a conditional generative adversarial network (conditional GAN) and/or a conditional variational autoencoder (VAE). The language model 340 may use a constrained decoder to change the tone of the translation result or change the difficulty level of a word.

In various embodiments, the language model 340 may control the output of a translation result based on a translation factor of a word translated by the translation engine 310. The language model 340 may change the tone of the translation result or change the difficulty level of a word by using a translation factor as a constraint.

For example, when the user enters "백내장을 영어로 '쉽게' 번역해줘([baegnaejang-eul yeong-eolo 'swibge' beon-yeoghaejwo])" as an utterance input, the translation engine 310 may determine words "영어로([yeong-eolo])" and "번역해줘([beon-yeoghaejwo])" as an intent, and may determine "백내장([baegnaejang])" or "쉽게([swibge])" as a parameter. The translation engine 310 may transmit the word "백내장([baegnaejang])" or "쉽게([swibge])" determined as a parameter to the translation factor module 320. Here, "쉽게(swibge)" may be specified as a translation factor for adjusting the difficulty level and managed correspondingly.

For reference, "쉽게(swibge)" in Korean can mean "easily" or "simply" in English. For example, when the user enters "백내장을 영어로 '쉽게' 번역해줘([baegnaejang-eul yeong-eolo 'swibge' beon-yeoghaejwo])", it may mean asking to translate a Korean word "백내장([baegnaejang])" into an easy English word.

The translation factor module 320 may determine the word "쉽게([swibge]])" as a translation factor among the words "백내장([baegnaejang])" and "쉽게([swibge]])" received from the translation engine 310 and transfer it to the translation engine 310 and/or the language model 340.

As the word "쉽게([swibge])" is a word that limits the difficulty level of translation and the word "백내장([baeg-naejang])" is not homophonous or polysemous in Korean, the translation engine 310 may transmit the translation result thereof to the language model 340 without selecting a category of the word "백내장([baegnaejang])" using the word "쉽게([swibge])". In this case, although the user's intent is to translate the Korean word "백내장([baegnaejang])" into an easy English word, the translation engine 310 may translate both "쉽게([swibge])" and "백내장([baegnaejang])" and transmit them to the language model 340.

The language model 340 may adjust the difficulty level of translation for "백내장([baegnaejang])" by using the translation factor "쉽게([swibge])" as a constraint from translations of "쉽게([swibge])" and "백내장([baegnaejang])", which are translated together and delivered from the translation engine 310. For example, the language model 340 may receive "easily" and "cataract" as translation results of "쉽게([swibge])" and "백내장([baegnaejang])" from the translation engine 310, and may change "cataract" to "eye disease" by adjusting the difficulty level of translation of "cataract" using the translation factor "easily" as a constraint and output it as the translation result. As "cataract" is a medical term and "eye disease" is a commonly used language, the expression "eye disease" may be less difficult. For example, the difficulty level of a translation result may be limited by modifiers such as easily, kids mode, exactly, short.

When outputting a translation result, the language model 240 may output it in speech and/or text. To output the translation result in speech, the language model 240 may further include a speech synthesis module (text to speech (TTS)).

Figure 4:
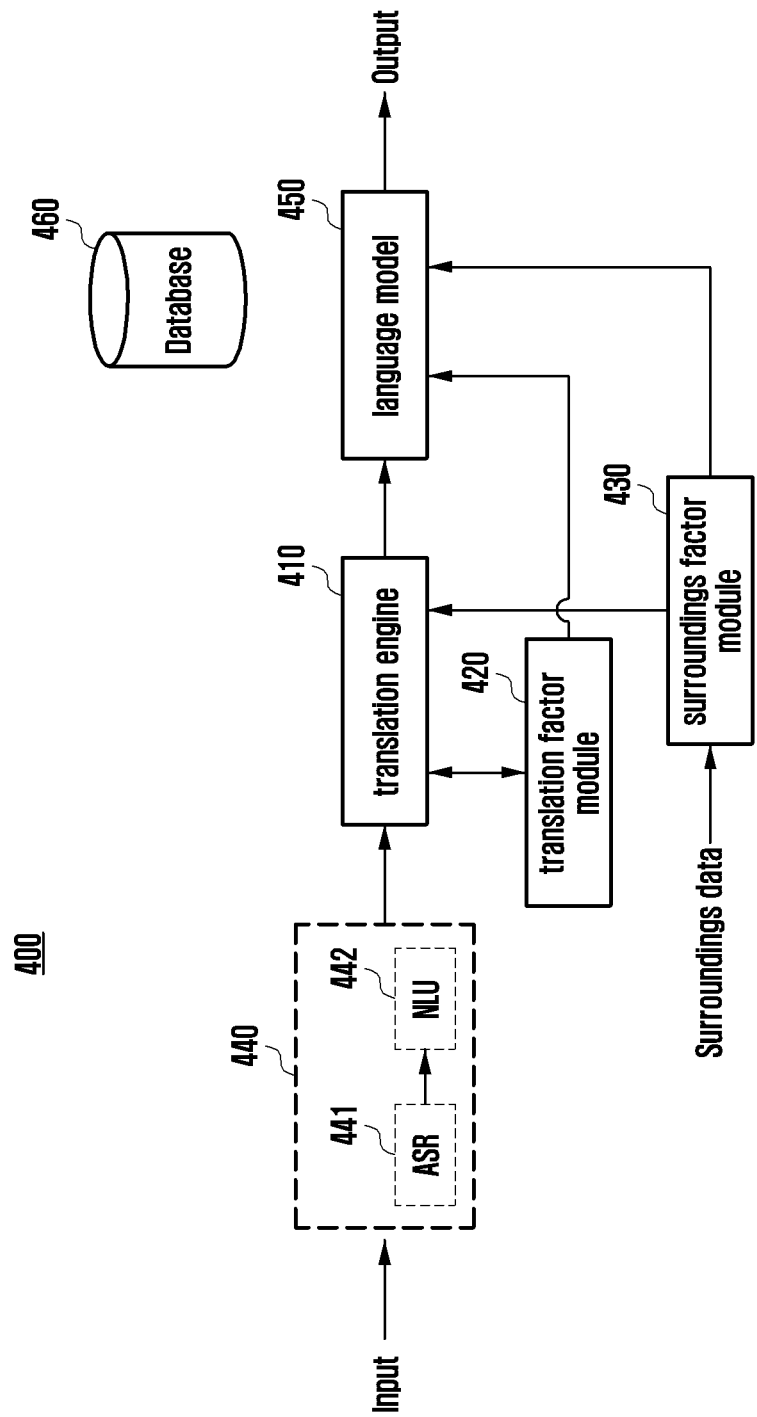
FIG. 4 is a diagram showing a translation system according to an embodiment of the disclosure.

FIG. 4 is a diagram showing a translation system according to an embodiment of the disclosure.

Referring to FIG. 4, in various embodiments, a translation system 400 may include a translation engine 410, a translation factor module 420, a surroundings factor module 430, an input recognition module 440, a language model 450 and/or a database 460.

The input recognition module 440 and the language model 450 included in the translation system 400 of FIG. 4 may be identical or similar to the input recognition module 230 and the language model 240 included in the translation system 200 of FIG. 2, and/or the input recognition module 330 and the language model 340 included in the translation system 300 of FIG. 3.

The translation factor module 420 included in the translation system 400 of FIG. 4 may be identical or similar to the translation factor module 320 of FIG. 3.

The surroundings factor module 430 included in the translation system 400 of FIG. 4 may be identical or similar to the surroundings factor module 220 of FIG. 2.

Among the configurations included in the translation system 400, the characteristics or operations of the configuration described in the translation system 200 of FIG. 2 and/or the translation system 300 of FIG. 3 are omitted or simplified.

In various embodiments, the translation factor module 420 may receive text data from the input recognition module 440. For example, the text data may include text data for translation operation among the user utterance input converted into text through the ASR 441 and/or the NLU 442.

In various embodiments, the translation factor module 420 may extract a translation factor from the received text data. The translation factor may mean a modifier for limiting the meaning of a word to be translated, not a word to be translated. For example, if the word to be translated is a polysemous word (or, homophone) having a plurality of meanings, a modifier used to limit the meaning of the word may be extracted as a translation factor.

In various embodiments, the translation factor module 420 may include a pre-processing method and/or a post-processing method. The pre-processing method may be an operation of identifying a limiting modifier that limits the meaning of the translation target and separating the limiting modifier from the text data. The post-processing method may be an operation of removing a limiting modifier from the target language and/or the translation target. For example, if the user enters an utterance "아삭아삭 배가 영어로 뭐야?([asag-asag baega yeong-eolo mwoya]?)", the pre-processing method may extract a limiting modifier that limits the meaning from among the utterance. In the above example, the limiting modifier "아삭아삭([asag-asag])" is not actually reflected in the final translation result, but it may be said to be a limiting modifier that clarifies the meaning of the word "배([bae])" to be translated. In the pre-processing method, such a limiting modifier can be extracted from the user's utterance. Also, it may be not used in translation.

As another example, in the case of translating a user's utterance into the language of the final result, it may be determined that a limiting modifier in the final result does not belong to the part requested by the user for translation, and post-processing may be performed to remove it. For instance, instead of translating "아삭아삭 배([asag-asag bae])" into "crispy pear", the limiting modifier "crispy" may be removed through post-processing and "pear" may be output as the final result.

In various embodiments, the pre-processing method included in the translation factor module 420 may be a method of explicitly receiving a limiting condition such as a limiting modifier. For example, the pre-processing method may be a conditional transformer language model.

In various embodiments, the surroundings factor module 430 may receive surroundings data collected through at least one of a camera (e.g., camera module 180 in FIG. 1), a microphone (e.g., input device 150 in FIG. 1), one or more sensors (e.g., sensor module 176 in FIG. 1), and/or a communication module (e.g., communication module 190 in FIG. 1) included in the electronic device 101, and may generate (or, select) a surroundings factor corresponding to the surroundings data. The surroundings factor module 430 may transmit the generated surroundings factor to the translation engine 410 and/or the language model 450.

In various embodiments, the surroundings data may include various types of information. For example, the surroundings data may include image information obtained by the camera module 180 of the electronic device 101 from the outside of the electronic device 101 or image analysis data obtained by analyzing an image. The surroundings data may include external acoustic information collected through the microphone of the electronic device 101 or acoustic analysis data obtained by analyzing external acoustic information. The surroundings data may include location information (e.g., GPS data, base station information) collected through the communication module 190. The surroundings data may include information (e.g., point of interest (POI)) received from an external server (e.g., server 108 in FIG. 1) through the communication module 190. The surroundings data is not limited to the above-described example.

In various embodiments, the surroundings factor module 430 may generate (or, select) a surroundings factor from the received surroundings data. The surroundings factor may indicate information that can be generated by analyzing and/or processing surroundings data and has a designated format (e.g., text data), or may be information selected from the database 460 based on surroundings data.

In various embodiments, the surroundings factor module 430 may transmit the generated surroundings factor to the translation engine 410 and/or the language model 450. In one embodiment, when receiving a request message for a surroundings factor from the translation engine 410 and/or the language model 450, the surroundings factor module 430 may transfer the surroundings factor to the translation engine 410 and/or the language model 450. For example, when the translation engine 410 has to translate a word having plural meanings, it may transmit a request message for a surroundings factor to the surroundings factor module 430.

In various embodiments, the translation engine 410 may perform translation on a word and/or sentence to be translated based on a translation factor received from the translation factor module 420 and/or a surroundings factor received from the surroundings factor module 430.

In various embodiments, the translation engine 410 may receive a surroundings factor from the surroundings factor module 430 and determine (or, generate) at least one keyword based on the surroundings factor.

In various embodiments, the translation engine 410 may determine (or, analyze) the usage association of each of plural candidate words based on the determined at least one keyword. The translation engine 410 may determine (or, analyze) the usage association between each of the determined at least one keyword and each of the plural candidate words.

In various embodiments, the translation engine 410 may determine (or, analyze) the usage association between a translation factor (e.g., limiting modifier) and each of plural candidate words.

In various embodiments, the translation engine 410 may determine (or, analyze) the usage association of each of plural candidate words based on the determined at least one keyword and translation factor.

For example, when the user at a grocery store makes an utterance "타는 배가 영어로 뭐야? ([taneun baega yeong-eolo mwoya?])", the surroundings factor module 430 may generate POI information and/or an address about 'grocery store' as a surroundings factor. The translation engine 410 may determine (or generate) 'food' and/or 'grocery store' as a keyword based on the surroundings factor such as the POI information and/or address about 'grocery store'. The translation factor module 420 may extract a limiting modifier limiting the meaning from "타는 배가 영어로 뭐야? ([taneun baega yeong-eolo mwoya]?)". The translation factor module 420 may generate "타는([taneun])" being a limiting modifier as a translation factor and transmit it to the translation engine 410. Here, '배([bae])' may have two meanings, a meaning of 'ship' and a meaning of 'pear'.

In various embodiments, the translation engine 410 may determine a word to be translated, a word to be translated in a sentence, and/or a candidate word that may become a sentence.

In various embodiments, the translation engine 410 may determine 'ship' and/or 'pear' as candidate words for '배([bae])' to be translated.

In various embodiments, the translation engine 410 may determine (or analyze) the usage association of each of the plural candidate words for at least one keyword and/or the translation factor based on the surroundings factor. The translation engine 410 may determine the usage association of the candidate word (e.g., 'ship' and/or 'pear') based on the keyword 'food' and/or 'grocery store' and/or the translation factor ' 타는([taneun])'. '타는([taneun])' in Korean may correspond to 'ridable' in English.

In various embodiments, the usage association may be analyzed based on, for example, dictionary data stored in the database 460 and/or history data storing a history of languages used by users. The history data may include language usage histories classified based on age, gender, or place.

In various embodiments, the translation engine 410 may determine a candidate word related to the usage association having the highest value among the determined plural usage associations. For example, the usage association between ' 배([bae])' having a meaning of 'ship' and ' 타는([taneun])' being a translation factor may have the highest value.

For example, the translation engine 410 may determine the usage association between ' 배([bae])' having a meaning of 'ship' and '타는([taneun])' being a translation factor, the usage association between ' 배([bae])' having a meaning of 'pear' and ' 타는([taneun])' being a translation factor, the usage association between ' 배([bae])' having a meaning of 'ship' and 'food' being a keyword, the usage association between ' 배([bae])' having a meaning of 'pear' and 'food' being a keyword, the usage association between ' '배([bae])' having a meaning of 'ship' and 'grocery store' being a keyword, and the usage association between ' 배([bae])' having a meaning of 'pear' and 'grocery store' being a keyword, and may determine a candidate word related to the usage association having the highest value among the determined plural usage associations.

In various embodiments, the translation engine 410 may translate the candidate word related to the usage association having the highest value. The translation engine 410 may translate the candidate word determined to be translated. For example, if ' 배([bae])' having a meaning of 'ship' has the highest usage association with ' 타는([taneun])' being a translation factor, the translation engine 410 may determine 'ship' as a translation for " 타는 배가 영어로 뭐야? ([taneun baega yeong-eolo mwoya]?)".

In various embodiments, the translation engine 410 may be unable to determine a candidate word to be translated among a plurality of candidate words. For example, if the electronic device 101 does not collect sufficient surroundings data, the electronic device 101 may be unable to determine a surroundings factor. As another example, although surroundings data is collected, if the usage association analysis using keywords and candidate words based on the surroundings data determines only values lower than the threshold (e.g., a threshold of 0.5 when the usage association has a maximum value of 1), the electronic device 101 may not determine the candidate word to be translated.

In this case, the electronic device 101 may translate all the candidate words and provide them to the user. For example, in the case of ' 배([bae])', both 'ship' and 'pear' can be provided to the user. Among them, the electronic device 101 may display a translation result (e.g., 'ship') corresponding to the candidate word having the highest usage association at the top position, and may determine the translation result by receiving a user selection for one of translation results included in the list. The electronic device 101 may store the translation result selected by the user in the history data. For example, 'ship' selected by the user may be mapped to ' 배([bae])' in Korean being the source language and stored.

In various embodiments, when outputting a translation result, the language model 450 may output it in speech and/or text. To output the translation result in speech, the language model 450 may further include a speech synthesis module (text to speech (TTS)).

In various embodiments, the language model 450 may adjust the difficulty level of translation by using the translation factor as a constraint from candidate words, which are translated together and delivered from the translation engine 410.

Figure 5:
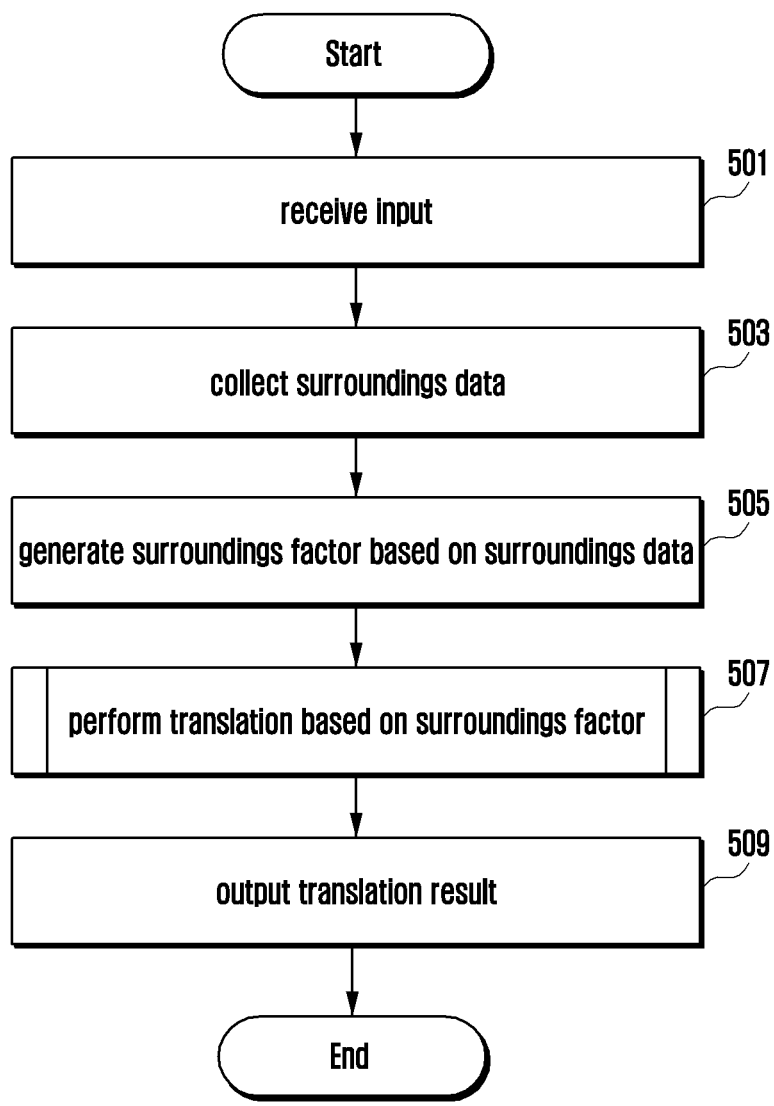
FIG. 5 is a flowchart illustrating a translation method of an electronic device according to an embodiment of the disclosure.

FIG. 5 is a flowchart illustrating a translation method of an electronic device according to an embodiment of the disclosure.

Referring to FIG. 5, in various embodiments, at operation 501, the electronic device 101 may receive an input under the control of the processor 120.

In various embodiments, the user input may be an utterance input and/or text input. For example, the electronic device 101 may execute a translation application (e.g., translation-only application, virtual assistant application) and receive a user's utterance input through an input module (e.g., input device 150 in FIG. 1, microphone). Or, it may receive a text input through a virtual keypad, handwriting recognition, and/or physical key input. In one embodiment, when the user input is an utterance input, the electronic device 101 may convert the user input into text data. At least some of the converted text data may include translation text data to be translated.

In various embodiments, at operation 503, the electronic device 101 may collect (or, receive) surroundings data by using at least one of one or more sensors (e.g., sensor module 176 in FIG. 1), a camera (e.g., camera module 180 in FIG. 1), a microphone (e.g., input device 150 in FIG. 1), and/or a communication module (e.g., communication module 190 in FIG. 1) under the control of the processor 120. For example, the surroundings data may include at least one of an image outside the electronic device 101 collected through the camera module 180, an ambient sound from outside the electronic device 101 collected through the microphone, or location information (e.g., GPS) or server data (e.g., weather information, POI information) collected through the communication module 190.

In various embodiments, the surroundings data may include analysis results of images collected by the camera module 180 from the outside of the electronic device 101 and/or ambient sounds collected through the microphone from the outside the electronic device 101. For example, the analysis results of images and/or ambient sounds may include information about age, gender, motion type, or place where the user is located.

In various embodiments, at operation 505, the electronic device 101 may generate (or, select) a surroundings factor based on the surroundings data under the control of the processor 120.

In various embodiments, at operation 507, the electronic device 101 may perform translation based on the surroundings factor under the control of the processor 120. For example, the electronic device 101 may translate translation text data to be translated based on the surroundings factor. For example, the translation text data may include homophonous or polysemous words. A detailed embodiment of this will be described with reference to FIG. 6.

In various embodiments, at operation 509, the electronic device 101 may output a translation result based on the surroundings factor under the control of the processor 120. For example, the electronic device 101 may output the translation result as it is, or output an updated translation result. For example, the electronic device 101 may change the form (e.g., honorifics) or difficulty level of the translation result. The electronic device 101 may change the output method of the translation result. For example, text data may be converted into speech data and output. The electronic device 101 may output the translation result through the display (e.g., display device 160 in FIG. 1) and/or the speaker (e.g., sound output device 155 in FIG. 1).

Those skilled in the art will readily understand that at least some of operations 501 to 509 may be performed by the server (e.g., server 108 in FIG. 1) according to various embodiments of the disclosure. For example, at operation 507, the server 108 may perform translation based on the surroundings factor received from the electronic device 101.

Figure 6:
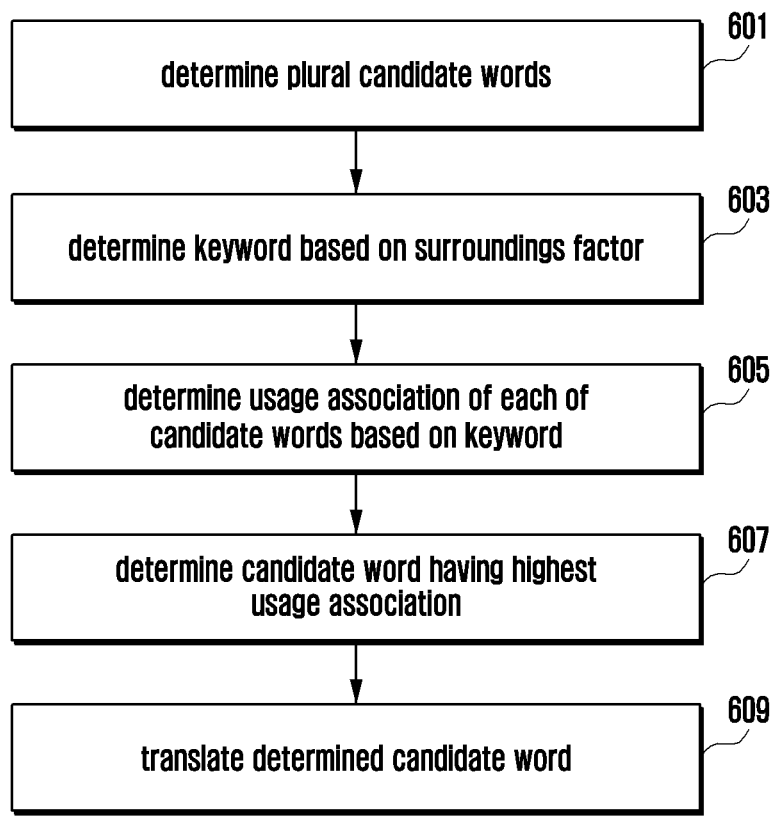
FIG. 6 is a flowchart illustrating a translation method of an electronic device according to an embodiment of the disclosure.

FIG. 6 is a flowchart illustrating a translation method of an electronic device according to an embodiment of the disclosure.

Referring to FIG. 6, operations 601 to 607 according to various embodiments may be understood as at least a portion of operation 507 in FIG. 5.

In various embodiments, at operation 601, the electronic device 101 may determine a plurality of candidate words corresponding to a polysemous word (or, homophone) included in the text data to be translated under the control of the processor 120. For example, the electronic device 101 may identify that the meaning corresponding to the text data to be translated is plural based on dictionary data. The electronic device 101 may determine words corresponding respectively to the plural meanings as candidate data based on the dictionary data.

In various embodiments, at operation 603, the electronic device 101 may determine a keyword based on a surroundings factor under the control of the processor 120. The surroundings factor may be a surroundings factor generated, for example, at operation 505 in FIG. 5. The keyword may be a word used to analyze, for example, each of plural candidate words. Keywords may be determined by using keyword data or dictionary data based on a surroundings factor. One or more keywords may be determined, a surroundings factor may be used as it is, or a word indicating information (e.g., place category) analyzed for a surroundings factor may be included, but there is no limitation.

In various embodiments, at operation 605, the electronic device 101 may determine (or, analyze) the usage association of each of the plural candidate words based on the determined at least one keyword under the control of the processor 120. The electronic device 101 may determine (or, analyze) the usage association between each of the determined at least one keyword and each of the plural candidate words. For example, when two keywords and two candidate words are determined, the translation engine 210 may determine four usage associations. The usage association may be analyzed based on, for example, dictionary data stored in the database 250 and/or history data storing a history of languages used by users.

In various embodiments, at operation 607, the electronic device 101 may determine a candidate word related to the usage association having the highest value among the plural determined usage associations under the control of the processor 120. For example, if the usage association analyzed based on a first keyword and a first candidate word has the highest value, the first candidate word may be determined as a candidate word to be translated.

In various embodiments, at operation 609, the electronic device 101 may translate the determined candidate word under the control of the processor 120. For example, the first candidate word may be translated into the target language by using dictionary data.

Figure 7:
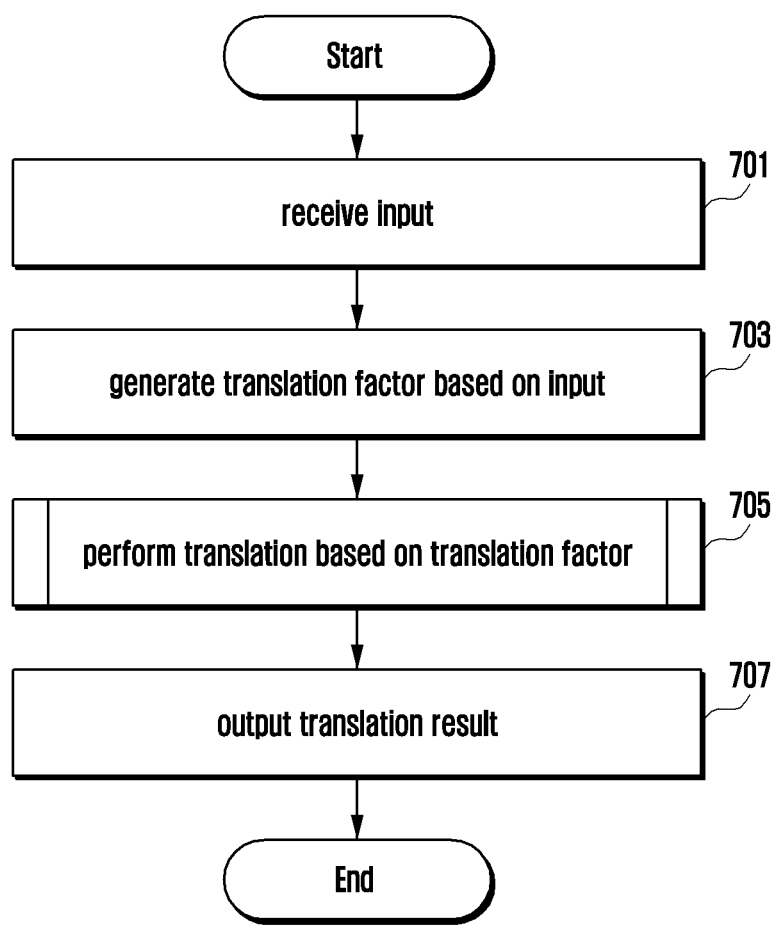
FIG. 7 is a flowchart illustrating a translation method of an electronic device according to an embodiment of the disclosure.

FIG. 7 is a flowchart illustrating a translation method of an electronic device according to an embodiment of the disclosure.

Referring to FIG. 7, in various embodiments, at operation 701, the electronic device 101 may receive an input under the control of the processor 120.

In various embodiments, the user input may be an utterance input and/or text input. For example, the electronic device 101 may execute a translation application (e.g., translation-only application, virtual assistant application) and receive a user's utterance input through an input module (e.g., input device 150 in FIG. 1, microphone). Or, it may receive a text input through a virtual keypad, handwriting recognition, and/or physical key input. In one embodiment, when the user input is an utterance input, the electronic device 101 may convert the user input into text data. At least some of the converted text data may include translation text data to be translated.

In various embodiments, at operation 703, the electronic device 101 may generate a translation factor based on the input under the control of the processor 120.

In various embodiments, at operation 705, the electronic device 101 may perform translation based on the translation factor under the control of the processor 120. For example, the electronic device 101 may translate the translation text data to be translated based on the translation factor. For example, the translation text data may include polysemous or homophonous words. A detailed embodiment of this will be described with reference to FIG. 8.

In various embodiments, at operation 707, the electronic device 101 may output a translation result based on the translation factor under the control of the processor 120. For example, the electronic device 101 may output the translation result as it is, or output an updated translation result. For example, the electronic device 101 may change the form (e.g., honorifics) or difficulty level of the translation result. The electronic device 101 may change the output method of the translation result. For example, text data may be converted into speech data and output. The electronic device 101 may output the translation result through the display (e.g., display device 160 in FIG. 1) and/or the speaker (e.g., sound output device 155 in FIG. 1).

Those skilled in the art will readily understand that at least some of operations 701 to 707 may be performed by the server (e.g., server 108 in FIG. 1) according to various embodiments of the disclosure. For example, at operation 705, the server 108 may perform translation based on the translation factor received from the electronic device 101.

Figure 8:
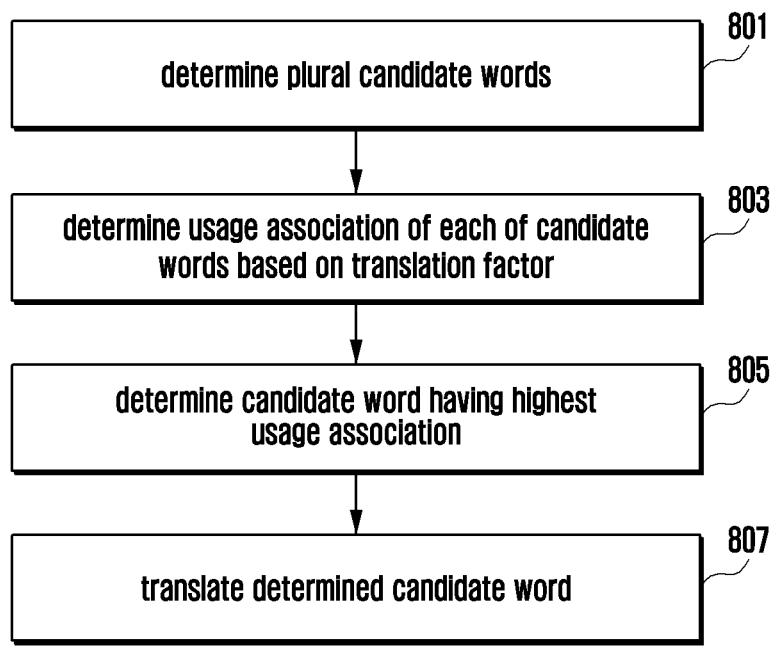
FIG. 8 is a flowchart illustrating a translation method of an electronic device according to an embodiment of the disclosure.

FIG. 8 is a flowchart illustrating a translation method of an electronic device according to an embodiment of the disclosure.

Referring to FIG. 8, operations 801 to 807 according to various embodiments may be understood as at least a portion of operation 705 in FIG. 7.

In various embodiments, at operation 801, the electronic device 101 may determine a plurality of candidate words corresponding to a polysemous word (or, homophone) included in the text data to be translated under the control of the processor 120. For example, the electronic device 101 may identify that the meaning corresponding to the text data to be translated is plural based on dictionary data. The electronic device 101 may determine words corresponding respectively to the plural meanings as candidate data based on the dictionary data.

In various embodiments, at operation 803, the electronic device 101 may determine (or, analyze) the usage association of each of the plural candidate words based on the translation factor under the control of the processor 120. For example, when two translation factors and two candidate words are determined, the translation engine 310 may determine four usage associations. The usage association may be analyzed based on, for example, dictionary data stored in the database 350 and/or history data storing a history of languages used by users.

In various embodiments, at operation 805, the electronic device 101 may determine a candidate word related to the usage association having the highest value among the plural determined usage associations under the control of the processor 120. For example, if the usage association analyzed based on a first translation factor and a first candidate word has the highest value, the first candidate word may be determined as a candidate word to be translated.

In various embodiments, at operation 807, the electronic device 101 may translate the determined candidate word under the control of the processor 120. For example, the first candidate word may be translated into the target language by using dictionary data.

Figure 9:
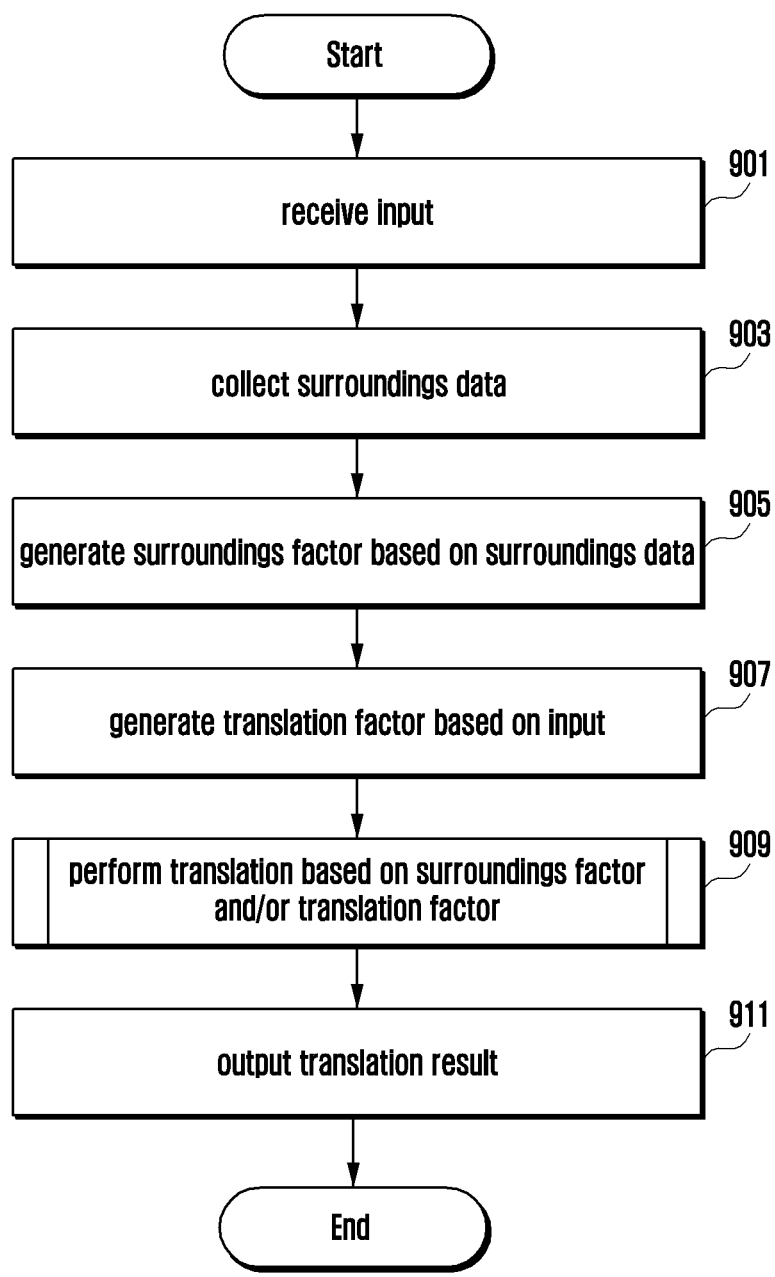
FIG. 9 is a flowchart illustrating a translation method of an electronic device according to an embodiment of the disclosure.

FIG. 9 is a flowchart illustrating a translation method of an electronic device according to an embodiment of the disclosure.

Referring to FIG. 9, in various embodiments, at operation 901, the electronic device 101 may receive an input under the control of the processor 120.

In various embodiments, the user input may be an utterance input and/or text input. For example, the electronic device 101 may execute a translation application (e.g., translation-only application, virtual assistant application) and receive a user's utterance input through an input module (e.g., input device 150 in FIG. 1, microphone). Or, it may receive a text input through a virtual keypad, handwriting recognition, and/or physical key input. In one embodiment, when the user input is an utterance input, the electronic device 101 may convert the user input into text data. At least some of the converted text data may include translation text data to be translated.

In various embodiments, at operation 903, the electronic device 101 may collect (or, receive) surroundings data by using at least one of one or more sensors (e.g., sensor module 176 in FIG. 1), a camera (e.g., camera module 180 in FIG. 1), a microphone (e.g., input device 150 in FIG. 1), and/or a communication module (e.g., communication module 190 in FIG. 1) under the control of the processor 120. For example, the surroundings data may include at least one of an image outside the electronic device 101 collected through the camera module 180, an ambient sound from outside the electronic device 101 collected through the microphone, or location information (e.g., GPS) or server data (e.g., weather information, POI information) collected through the communication module 190.

In various embodiments, the surroundings data may include analysis results of images collected by the camera module 180 from the outside of the electronic device 101 and/or ambient sounds collected through the microphone from the outside the electronic device 101. For example, the analysis results of images and/or ambient sounds may include information about age, gender, motion type, or place where the user is located.

In various embodiments, at operation 905, the electronic device 101 may generate (or, select) a surroundings factor based on the surroundings data under the control of the processor 120.

In various embodiments, at operation 907, the electronic device 101 may generate (or, extract) a translation factor based on the input under the control of the processor 120.

In various embodiments, at operation 909, the electronic device 101 may perform translation based on the surroundings factor and/or the translation factor under the control of the processor 120. For example, the electronic device 101 may translate translation text data to be translated based on the surroundings factor and/or the translation factor. For example, the translation text data may include polysemous or homophonous words. A detailed embodiment of this will be described with reference to FIG. 10.

In various embodiments, at operation 911, the electronic device 101 may output a translation result based on the surroundings factor and/or the translation factor under the control of the processor 120. For example, the electronic device 101 may output the translation result as it is, or output an updated translation result. For example, the electronic device 101 may change the form (e.g., honorifics) or difficulty level of the translation result. The electronic device 101 may change the output method of the translation result. For example, text data may be converted into speech data and output. The electronic device 101 may output the translation result through the display (e.g., display device 160 in FIG. 1) and/or the speaker (e.g., sound output device 155 in FIG. 1).

Those skilled in the art will readily understand that at least some of operations 901 to 911 may be performed by the server (e.g., server 108 in FIG. 1) according to various embodiments of the disclosure. For example, at operation 909, the server 108 may perform translation based on the surroundings factor received from the electronic device 101.

Figure 10:
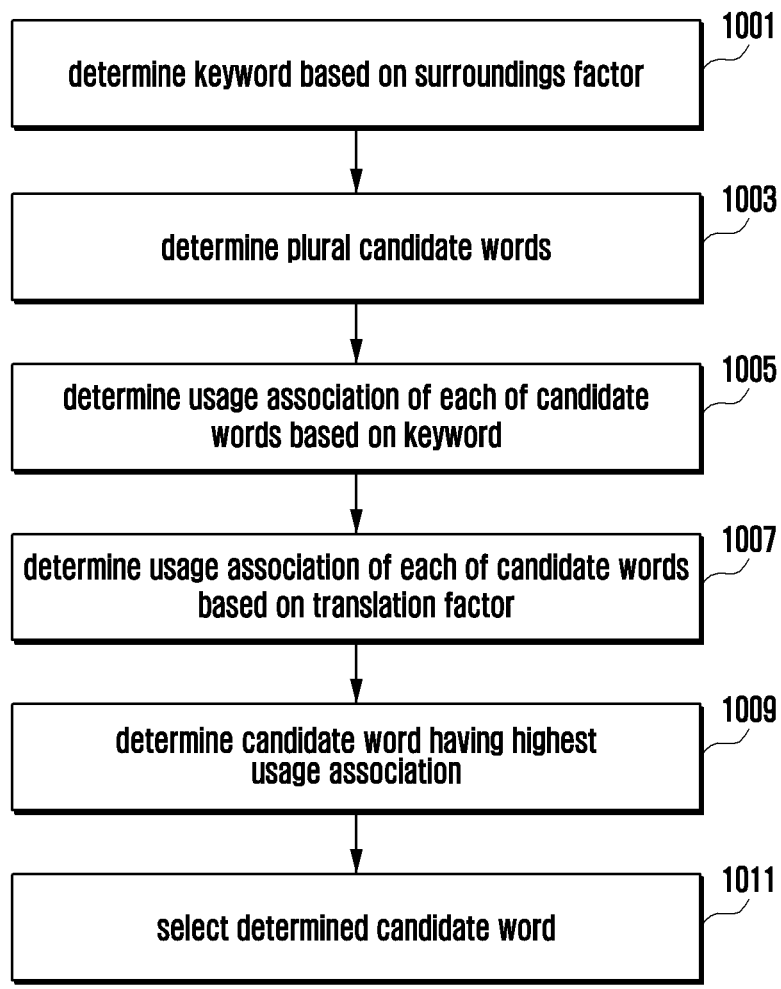
FIG. 10 is a flowchart illustrating a translation method of an electronic device according to an embodiment of the disclosure.

FIG. 10 is a flowchart illustrating a translation method of an electronic device according to an embodiment of the disclosure.

Referring to FIG. 10, operations 1001 to 1011 according to various embodiments may be understood as at least a portion of operation 909 in FIG. 9.

In various embodiments, at operation 1001, the electronic device 101 may determine a keyword based on a surroundings factor under the control of the processor 120. The surroundings factor may be a surroundings factor generated, for example, at operation 1005 in FIG. 9. The keyword may be a word used to analyze, for example, each of plural candidate words. Keywords may be determined by using keyword data or dictionary data based on a surroundings factor. One or more keywords may be determined, a surroundings factor may be used as it is, or a word indicating information (e.g., place category) analyzed for a surroundings factor may be included, but there is no limitation.

In various embodiments, at operation 1003, the electronic device 101 may determine a plurality of candidate words corresponding to a polysemous word (or, homophone) included in the text data to be translated under the control of the processor 120. For example, the electronic device 101 may identify that the meaning corresponding to the text data to be translated is plural based on dictionary data. The electronic device 101 may determine words corresponding respectively to the plural meanings as candidate data based on the dictionary data.

In various embodiments, at operation 1005, the electronic device 101 may determine (or, analyze) the usage association of each of the plural candidate words based on the determined at least one keyword under the control of the processor 120. The electronic device 101 may determine (or, analyze) the usage association between each of the determined at least one keyword and each of the plural candidate words. For example, when two keywords and two candidate words are determined, the translation engine 210 may determine four usage associations. The usage association may be analyzed based on, for example, dictionary data stored in the database 250 and/or history data storing a history of languages used by users.

In various embodiments, at operation 1007, the electronic device 101 may determine (or, analyze) the usage association of each of the plural candidate words based on the translation factor under the control of the processor 120. For example, when two translation factors and two candidate words are determined, the translation engine 310 may determine four usage associations. The usage association may be analyzed based on, for example, dictionary data stored in the database 350 and/or history data storing a history of languages used by users.

In various embodiments, at operation 1009, the electronic device 101 may determine a candidate word related to the usage association having the highest value among the plural determined usage associations under the control of the processor 120. For example, if the usage association analyzed for one of the translation factor and the keyword and a first candidate word has the highest value, the first candidate word may be determined as a candidate word to be translated.

In various embodiments, at operation 1011, the electronic device 101 may translate the determined candidate word under the control of the processor 120. For example, the first candidate word may be translated into the target language by using dictionary data.

Operations 1001 to 1011 according to various embodiments may be understood as a portion of operation 909 in FIG. 9.

Figure 11:
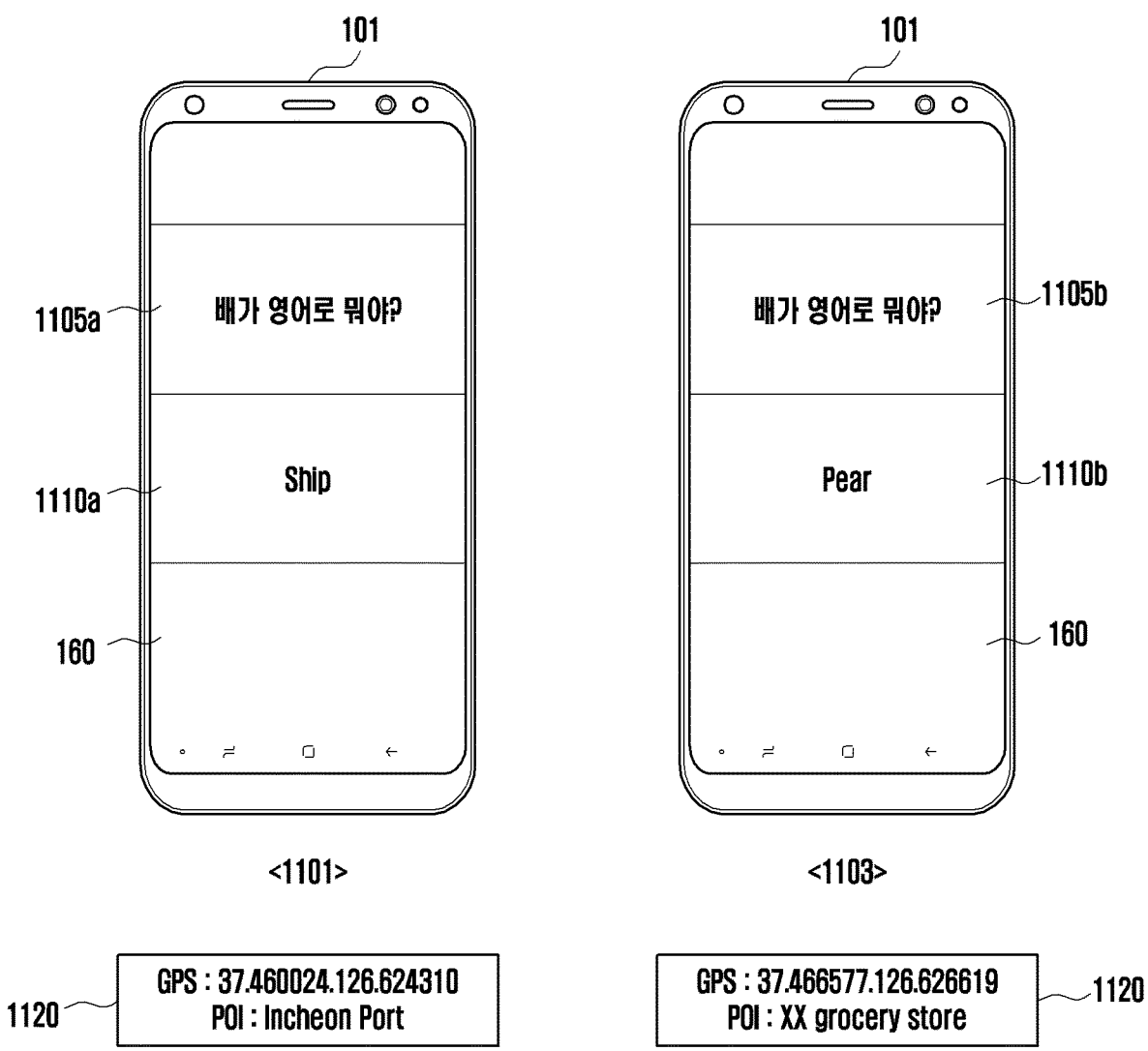
FIG. 11 is a diagram illustrating a translation result of an electronic device according to an embodiment of the disclosure.

FIG. 11 is a diagram illustrating a translation result of an electronic device according to an embodiment of the disclosure.

Referring to FIG. 11, in various embodiments, the electronic device (e.g., electronic device 101 in FIG. 1) may execute a translation application. Screens 1101 and 1103 are examples of screens of the translation application being executed (e.g., virtual assistant application).

In various embodiments, in screen 1101 and screen 1103, the user may enter an utterance input " 배가 영어로 뭐야" through the microphone of the electronic device 101 in translation. The electronic device 101 may convert the utterance input into text data and display it in an input display region 1105a or 1105b included in the screen. The electronic device 101 may determine translation text data among the text data. The translation text data may be a polysemous word. For example, when ' 배' is determined as the translation text data, ' 배' may be a polysemous word having meanings of 'ship' and 'pear' in English being the target language. The electronic device 101 may collect surroundings data 1120 including the user's location by using the communication module (e.g., communication module 190 in FIG. 1). For example, the surroundings data 1120 may be collected as GPS coordinates '37.460024.126.62431' and/or POI information 'Incheon Port'. The electronic device 101 may generate a surroundings factor from the surroundings data 1120. For example, the surroundings factor may be generated as 'Incheon Port' by analyzing the GPS coordinates, or the surroundings data can be used as a surroundings factor when the surroundings data includes 'Incheon Port'. The electronic device 101 may determine at least one keyword based on the surroundings factor. For example, the at least one keyword may include a word related with the surroundings factor, such as 'Incheon Port', 'sea', 'port'. In another embodiment, the electronic device 101 may collect GPS coordinates '37.466577.126.626619' and/or POI information 'XX grocery store' as surroundings data. The electronic device 101 may generate a surroundings factor based on the surroundings data, and determine at least one keyword (e.g., 'XXgrocery store', 'grocery store', 'food') related to the surroundings factor. In one embodiment, when the electronic device 101 has received 'Incheon Port' as surroundings data, for a polysemous word ' 배', as in screen <1101>, the electronic device 101 may display 'ship', which is a result of translating a word having a high usage association with the keyword (e.g., 'sea'), in a result display region 1110a. In another embodiment, when the electronic device 101 has received 'XXgrocery store' as surroundings data, for a polysemous word ' 배', as in screen <1103>, the electronic device 101 may display 'pear', which is a result of translating a word having a high usage association with the keyword (e.g., 'food'), in a result display region 1110b. The electronic device 101 may output the translation result through the speaker (e.g., sound output device 155 in FIG. 1). When performing translation on a user input including a polysemous word, the electronic device 101 according to various embodiments may increase the accuracy of the translation result by using collected surroundings data.

Figure 12:
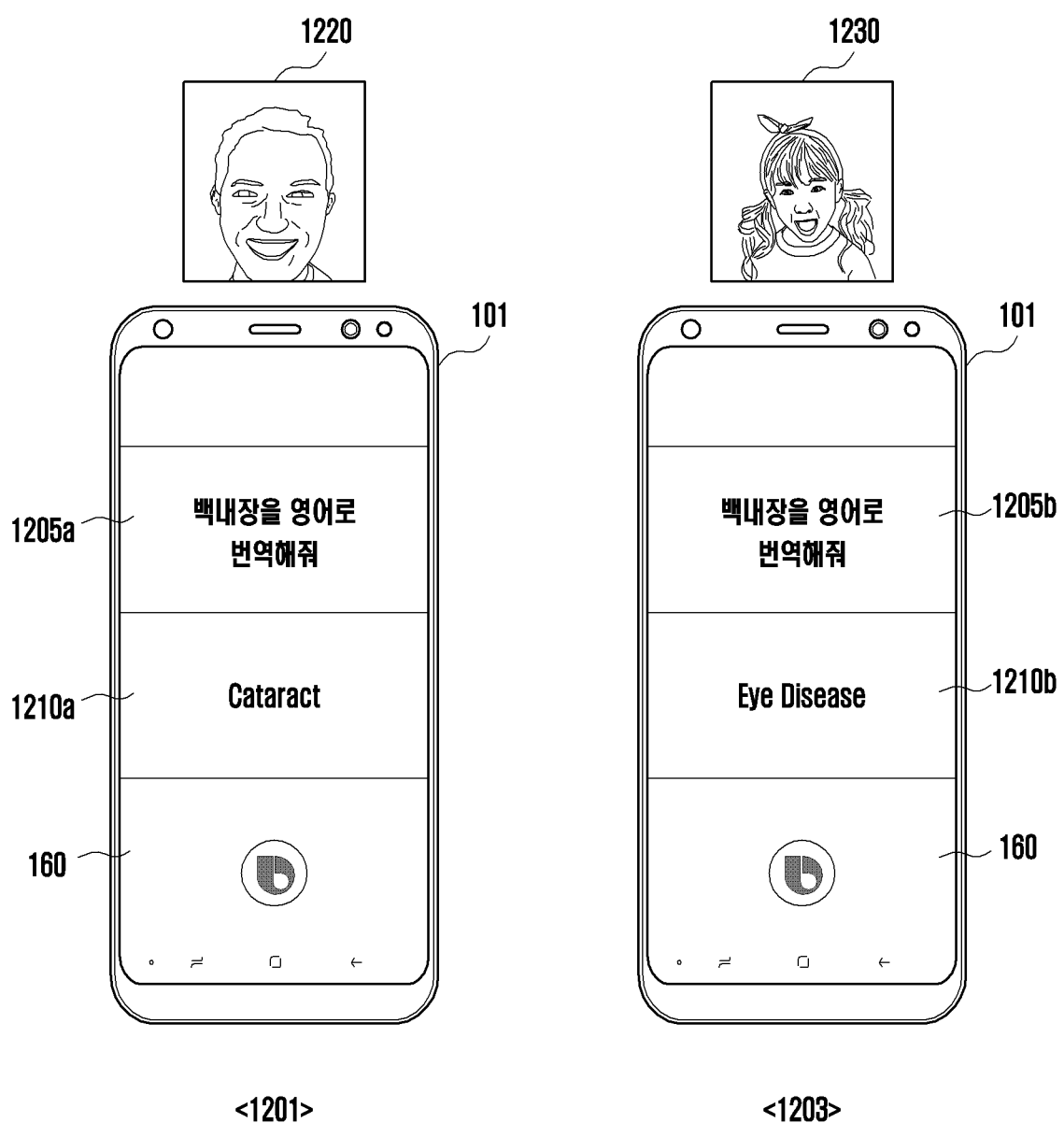
FIG. 12 is a diagram illustrating a translation result of an electronic device 101 according to an embodiment of the disclosure.

FIG. 12 is a diagram illustrating a translation result of an electronic device according to an embodiment of the disclosure.

Referring to FIG. 12, in various embodiments, the electronic device (e.g., electronic device 101 in FIG. 1) may execute a translation application. Screens 1201 and 1203 are examples of screens of the translation application being executed (e.g., virtual assistant application).

In various embodiments, with reference to screen 1201 and screen 1203, the user may enter an utterance input " 백내장을 영어로 번역해줘" through the microphone of the electronic device 101 in translation. The electronic device 101 may convert the utterance input into text data and display it in an input display region 1205a or 1205b included in the screen. The electronic device 101 may determine translation text data among the text data. For example, the electronic device 101 may determine ' 백내장' as translation text data. The electronic device 101 may determine that the determined translation text data is not a polysemous word (or, homophone), and may translate '백내장' into 'cataract'.

In various embodiments, the electronic device 101 may collect surroundings data through the camera (e.g., camera module 180 in FIG. 1). For example, the user making an utterance may be photographed using a camera of the front surface including the display (e.g., display device 160 in FIG. 1) of the electronic device 101.

In various embodiments, with reference to screen 1201, as a result of analyzing the user shape 1220 included in the image collected through the camera module 180 by the electronic device 101, '40's' and 'male' may be generated as a surroundings factor. The electronic device 101 may determine that there is no need to change the difficulty level based on the generated surroundings factor, and display the translation result 'cataract' on the result display region 1210a. The electronic device 101 may output the translation result 'cataract' through the speaker (e.g., sound output device 155 in FIG. 1).

In various embodiments, with reference to screen 1203, as a result of analyzing the user shape 1230 included in the image collected through the camera module 180 by the electronic device 101, 'kid' and 'female' may be generated as a surroundings factor. The electronic device 101 may determine to change the difficulty level based on the generated surroundings factor. For example, the translation result may be updated with 'eye disease' being a higher category of 'cataract'. The electronic device 101 may display 'eye disease' as a translation result in the result display region 1210*b*. The electronic device 101 may also output the translation result through the speaker (e.g., sound output device 155 in FIG. 1).

In various embodiments, it is assumed that the user of screen 1201 is the owner of the electronic device 101. The electronic device 101 may store an owner-related profile in the memory (e.g., memory 130 in FIG. 1). For example, the profile may include various information of the user such as name, age, biometric information (e.g., face image, fingerprint image), and occupation. When the electronic device 101 collects an image including the user's face through the camera module 180, it may analyze the image and recognize that the user currently in use is the owner. Recognizing the owner, the electronic device 101 may output a translation result with reference to the language history data of the owner. For example, it can be determined that there is no need to adjust the difficulty level of the translation result based on the usual language used by the user.

In various embodiments, it is assumed that the user of screen 1203 is a user who is using the electronic device 101 of another owner. For example, it is assumed that the user of screen 1201 is the owner of the electronic device 101. For example, the electronic device 101 may store an owner-related profile in the memory (e.g., memory 130 in FIG. 1). The electronic device 101 may output a translation result based on a surroundings factor generated from surroundings data. For example, although a profile related to a male of forties is stored, the electronic device 101 may output a translation result based on the surroundings factor related to the current user if the user-related surroundings factor based on the collected surroundings data is 'kid'.

Figure 13:
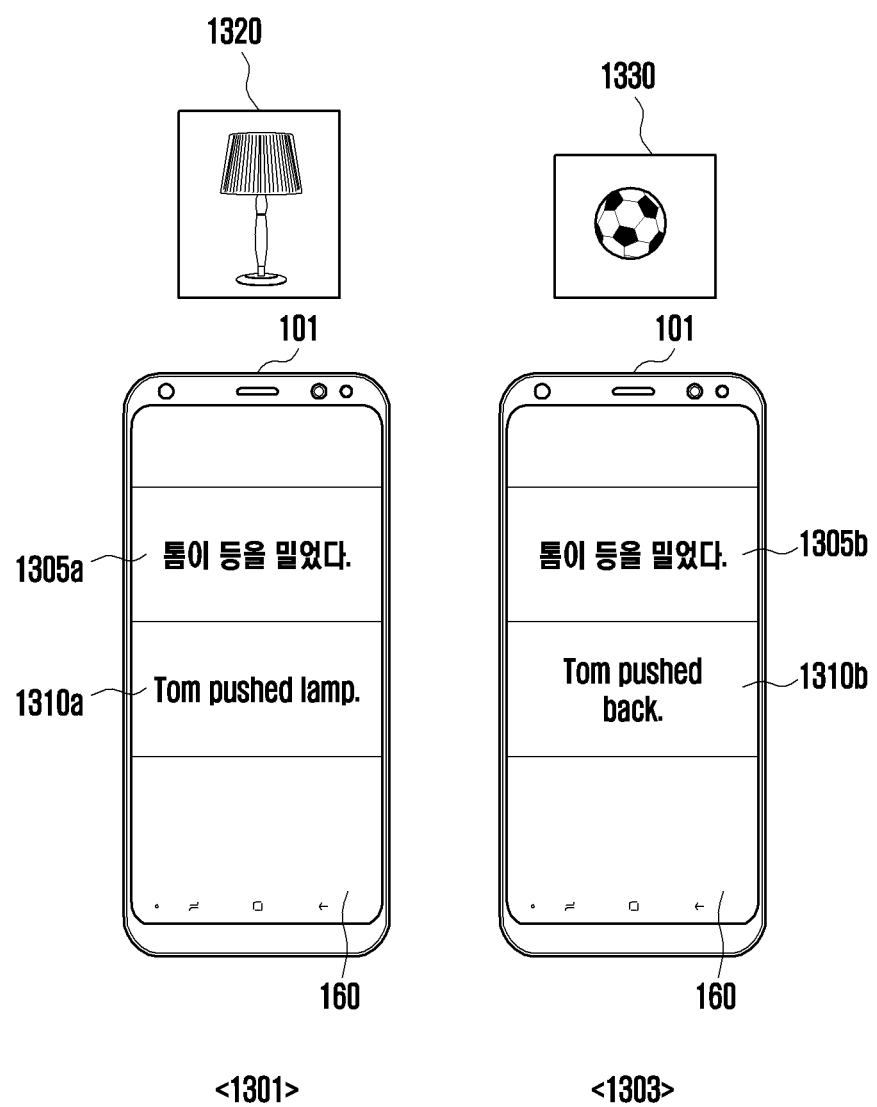
FIG. 13 is a diagram illustrating a translation result of an electronic device according to an embodiment of the disclosure.

FIG. 13 is a diagram illustrating a translation result of an electronic device according to an embodiment of the disclosure.

Referring to FIG. 13, in various embodiments, the electronic device (e.g., electronic device 101 in FIG. 1) may execute a translation application. Screens 1301 and 1303 are examples of screens of the translation application being executed (e.g., translation-only application).

In various embodiments, the electronic device 101 may collect surroundings data through the camera (e.g., camera module 180 in FIG. 1). For example, the surrounding environment of the electronic device 101 may be photographed by using a camera included in the rear surface opposite to the front surface including the display (e.g., display device 160 in FIG. 1) of the electronic device 101.

In various embodiments, in screen 1301 and screen 1303, when the user enters an utterance input "톰이 등을 밀었다" through the microphone of the electronic device 101, the electronic device 101 may convert the utterance input into text data and display it in an input display region 1305*a* or 1305*b*.

In various embodiments, the electronic device 101 may determine translation text data among the text data. For example, in the case of a translation-only application, the entire text data may be determined as translation text data. For example, the input "톰이 등을 밀었다" may be determined as translation text data. The electronic device 101 may determine that there is a polysemous word in the translation text data. '등' may be is a polysemous word having meanings of 'lamp' and 'back' in English being the target language.

In various embodiments, the electronic device 101 may collect an image of the surrounding environment of the electronic device 101 through the camera module 180. For example, with reference to screen 1301, a table lamp 1320 may be included in the image collected by the electronic device 101. The electronic device 101 may recognize the table lamp 1320 included in the image through image analysis, and may generate '탁자 등' as a surroundings factor. The electronic device 101 may determine the translation result for '등' as 'lamp' based on the surroundings factor '탁자 등', and display 'Tom pushed the lamp' as the entire translation result in the result display region 1310*a*. For example, with reference to screen 1303, a soccer ball 1330 may be included in an image collected by the electronic device 101. The electronic device 101 may recognize the soccer ball 1330 included in the image through image analysis and generate '축구 공(soccer ball)' as a surroundings factor. The electronic device 101 may determine the translation result for '등' as 'back' based on the surroundings factor '축구 공(soccer ball)', and display 'Tom pushed back' as the entire translation result in the result display region 1310*b*.

Figure 14:
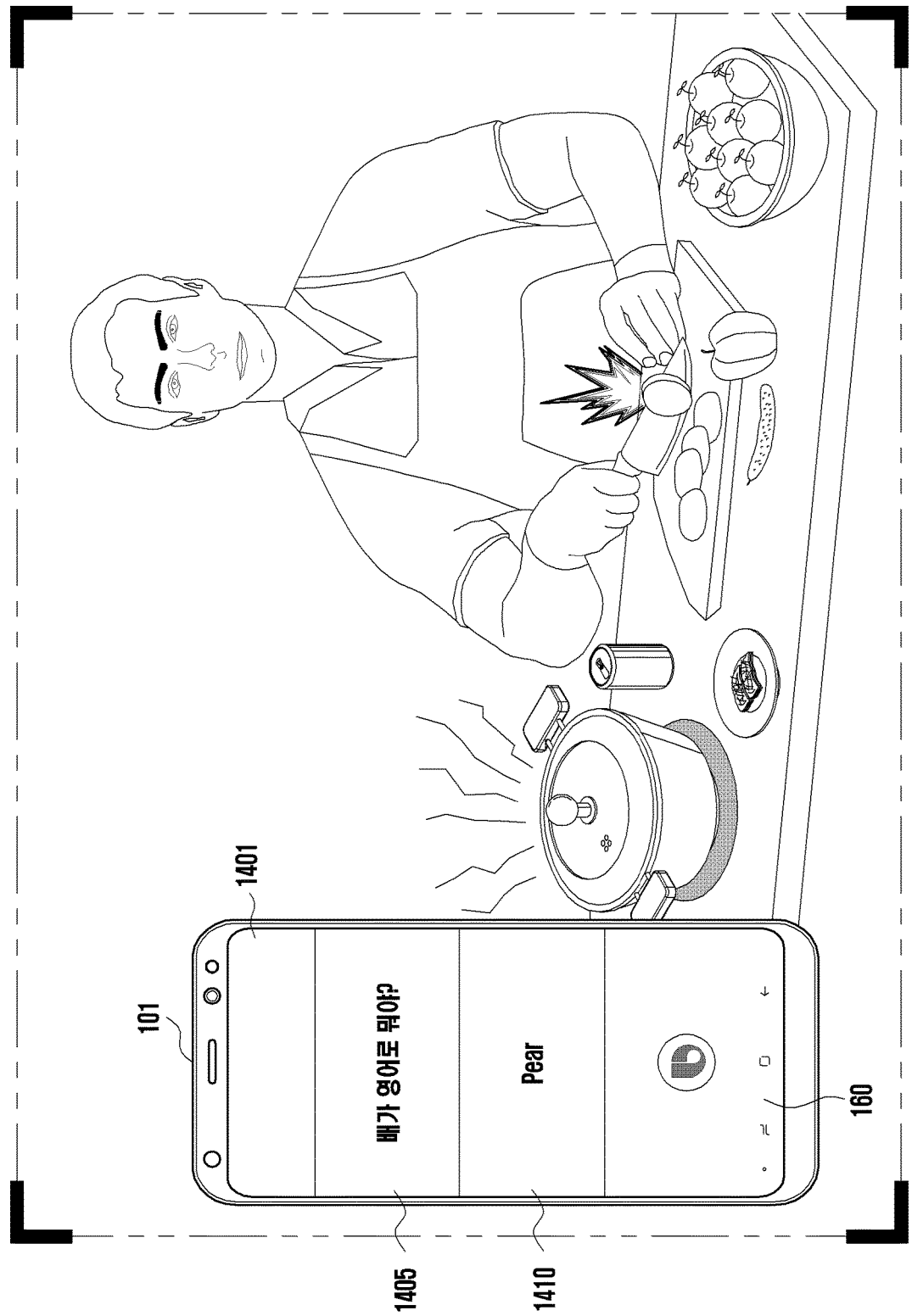
FIG. 14 is a diagram illustrating a translation result of an electronic device according to an embodiment of the disclosure.

FIG. 14 is a diagram illustrating a translation result of an electronic device according to an embodiment of the disclosure.

Referring to FIG. 14, in various embodiments, the electronic device (e.g., electronic device 101 in FIG. 1) may execute a translation application. The electronic device 101 may display a screen 1401 of the translation application (e.g., virtual assistant application) being executed on the display (e.g., display device 160 in FIG. 1).

In various embodiments, the electronic device 101 may receive user's utterance input "배가 영어로 뭐야" through the microphone (e.g., input device 150 in FIG. 1). The electronic device 101 may convert the utterance input into text data and display it in an input display region 1405 included in the screen. The electronic device 101 may determine translation text data among the text data. The translation text data may be a polysemous word. For example, when '배' is determined as the translation text data, '배' may be a polysemous word having meanings of 'ship' and 'pear' in English being the target language.

In various embodiments, the electronic device 101 may collect an ambient environment sound through the microphone (e.g., input device 150 in FIG. 1). The ambient environment sound may be collected at the same time as the user utterance input or may be collected for a specified time (e.g., 1 second) before and/or after the utterance input. The electronic device 101 may determine a place where the user is located by analyzing the collected ambient environment sound. For example, assuming the user is cooking in the kitchen, the electronic device 101 may analyze surroundings data such as a sound of cutting, a sound of flowing water, and a sound of boiling food for an ambient environment sound, and may generate a surroundings factor such as '부엌(kitchen)' or '요리(cooking)' based on the surroundings data. The electronic device 101 may determine keywords such as '부엌(kitchen)', '요리(cooking)' and '음식(food)' based on the surroundings factor, and may determine a translation result by analyzing the usage association between plural candidate words corresponding to meanings of '배' and at least one keyword. For example, the electronic device 101 may translate '배' having a meaning of 'pear', which has the highest usage association with the keyword '음식', and display it in the result display region 1410. The electronic device 101 may output the translation result through the speaker (e.g., sound output device 155 in FIG. 1).

Figure 15:
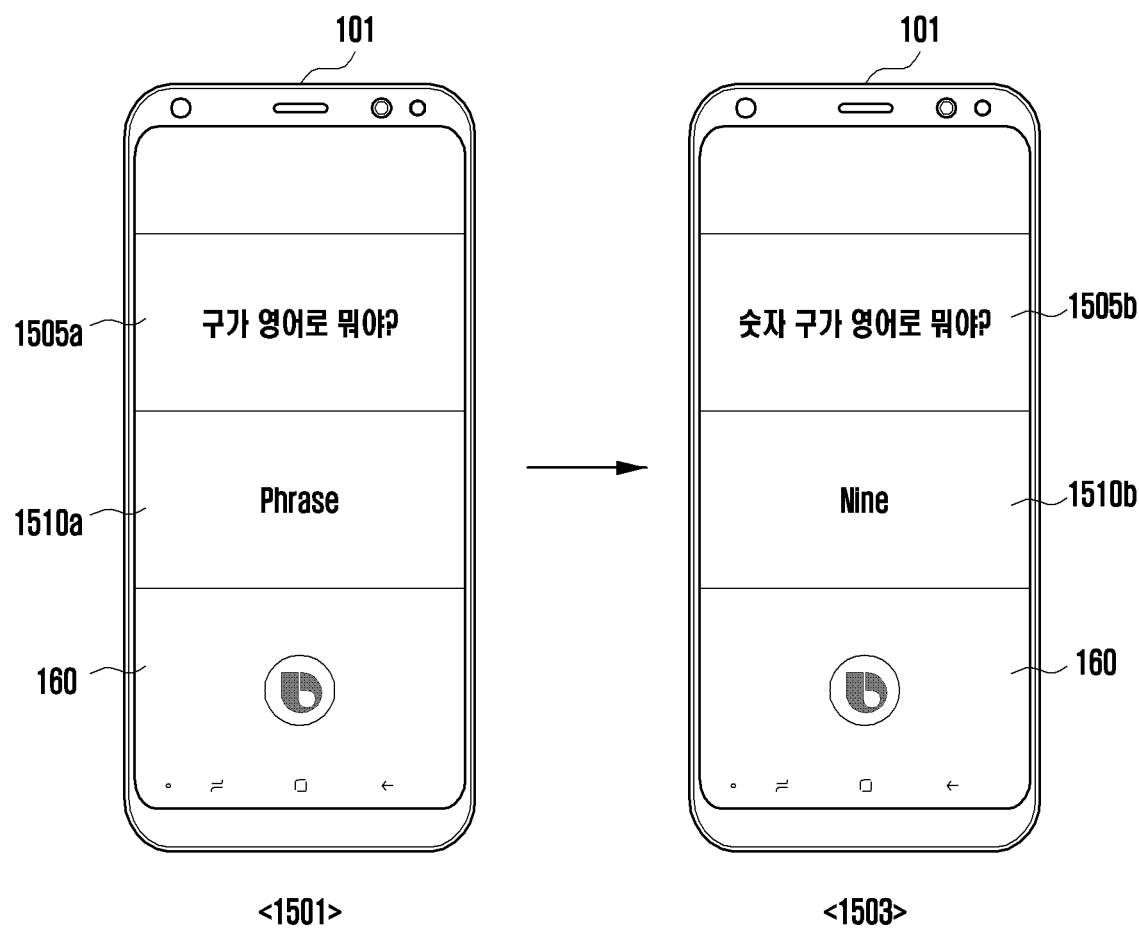
FIG. 15 is a diagram illustrating a translation result of an electronic device according to an embodiment of the disclosure.

FIG. 15 is a diagram illustrating a translation result of an electronic device according to an embodiment of the disclosure.

Referring to FIG. 15, in screen 1501, when the user enters an utterance input "구가 영어로 뭐야? ([gu ga yeong-eolo mwoya]?)" (1505a) through the microphone of the electronic device 101, the electronic device 101 may convert the utterance input into text and display it on the display device 160, and display the translation result "phrase" (1510a) or output it in speech. "구([gu])" in Korean is a homophonous or polysemous word that can mean "phrase" or "nine" in English.

In screen 1503, the user may limit the translation target of "구([gu])" to a number. For example, when the user enters an utterance input "숫자 구가 영어로 뭐야? ([susja guga yeong-eolo mwoya]?)" (1505b) through the microphone of the electronic device 101, the electronic device 101 may convert the utterance input into text and display it on the display device 160, and display the translation result "nine" (1510b) and/or output it in speech. The electronic device 101 according to various embodiments may distinguish between "숫자(number)" and "구([gu])" through an utterance input and recognize "숫자(number)" as a translation factor (or, limiting modifier) limiting the translation range or target to thereby perform translation. For example, it may analyze the usage association between '숫자(number)' and '구' and translate '구'into 'nine' based thereon.

Figure 16:
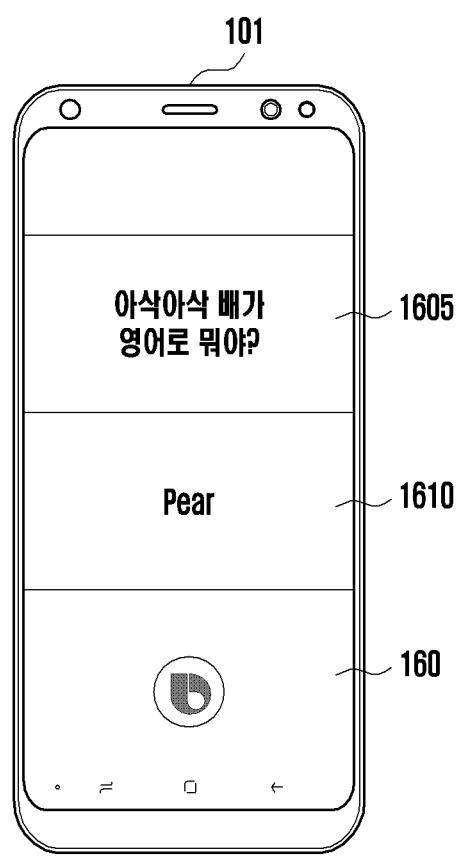
FIG. 16 is a diagram illustrating a translation result of an electronic device according to an embodiment of the disclosure.

FIG. 16 is a diagram illustrating a translation result of an electronic device according to an embodiment of the disclosure.

Referring to FIG. 16, the user may limit the candidate word for "배([bae])" to an onomatopoeic word. When the user enters an utterance input "아삭아삭 배가 영어로 뭐야?([asag-asag bae ga yeong-eolo mwoya]?)" (1605) through the microphone of the electronic device 101, the electronic device 101 may convert the utterance input into text and display it on the display device 160, and display the translation result "pear" and/or output it in speech. The electronic device 101 according to various embodiments may convert the utterance input into text data, and may distinguish "아삭아삭(crunch)" and "배" in the converted text data. The electronic device 101 may determine "아삭아삭(crunch)" as a translation factor (or, limiting modifier) limiting the translation range or target and may analyze the usage association with '배'. The electronic device 101 may translate '배' into 'pear' (1610) based on the usage association.

Figure 17:
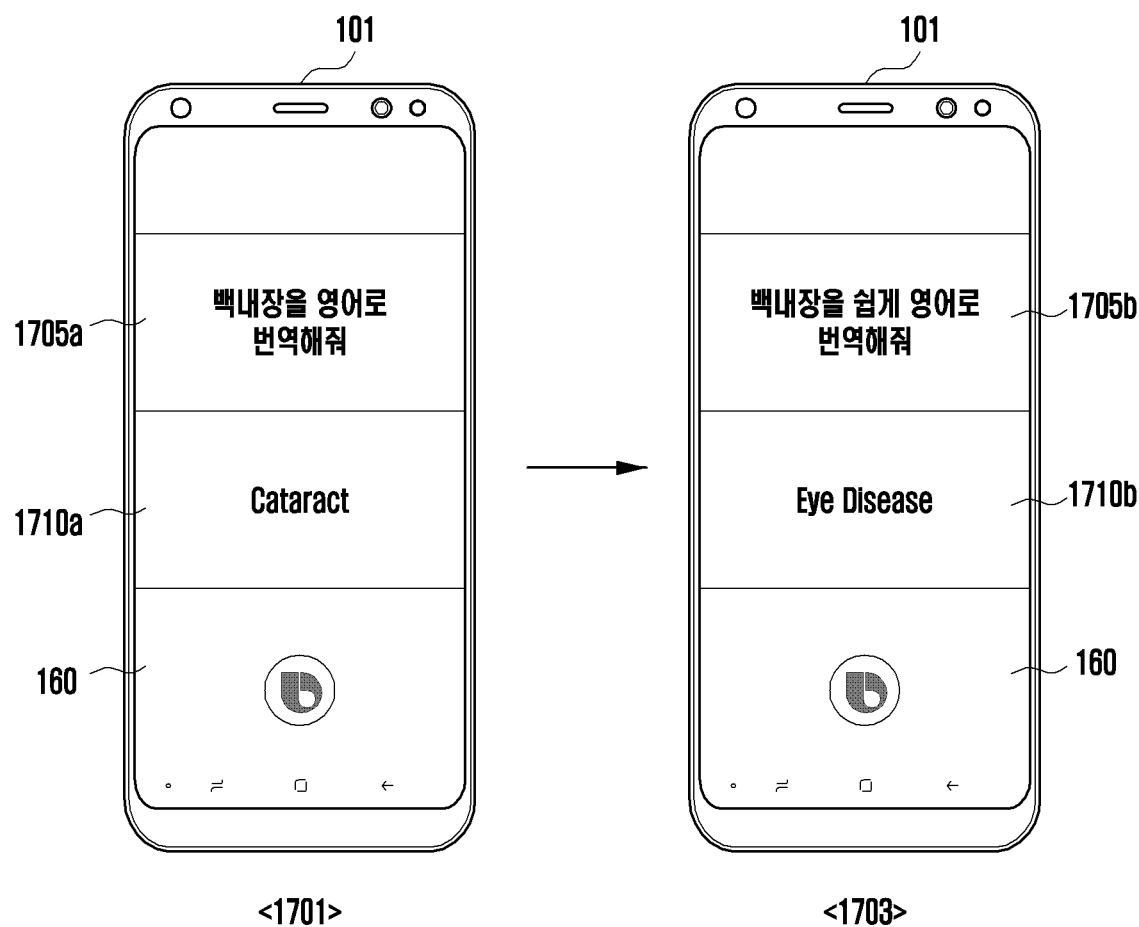
FIG. 17 is a diagram illustrating a translation result of an electronic device according to an embodiment of the disclosure.

FIG. 17 is a diagram illustrating a translation result of an electronic device according to an embodiment of the disclosure.

Referring to FIG> 17, in screen 1701, when the user enters an utterance input "백내장을 영어로 번역해줘([baegnaejang-eul yeong-eolo beon-yeoghaejwo])" (1705a) through the microphone of the electronic device 101, the electronic device 101 may convert the utterance input into text and display it on the display device 160, and display the translation result "cataract" (1710a) and/or output it in speech.

In screen 1703, the user may limit the difficulty level of the translation result of "백내장([baegnaejang])". When the user enters an utterance input "백내장을 영어로 '쉽게' 번역해줘([baegnaejang-eul yeong-eolo 'swibge' beon-yeoghaejwo])" (1705b) through the microphone of the electronic device 101, the electronic device 101 may convert the utterance input into text and display it on the display device 160, and display the translation result "eye disease" (1710b) and/or output it in speech. The electronic device 101 may determine "쉽게([swibge])" as a translation factor. The electronic device 101 may change the difficulty level of translation based on the translation factor. When the translation factor is '쉽게(easily)', the electronic device 101 may determine to lower the difficulty level of the translation result, and may translate '백내장' into 'eye disease'.

The electronic device 101 according to various embodiments may limit the difficulty level of the translation result through an utterance input. For example, the difficulty level of a translation result may be limited by a translation factor (or, limiting modifier) such as easily, kids mode, exactly, or short.

Figure 18:
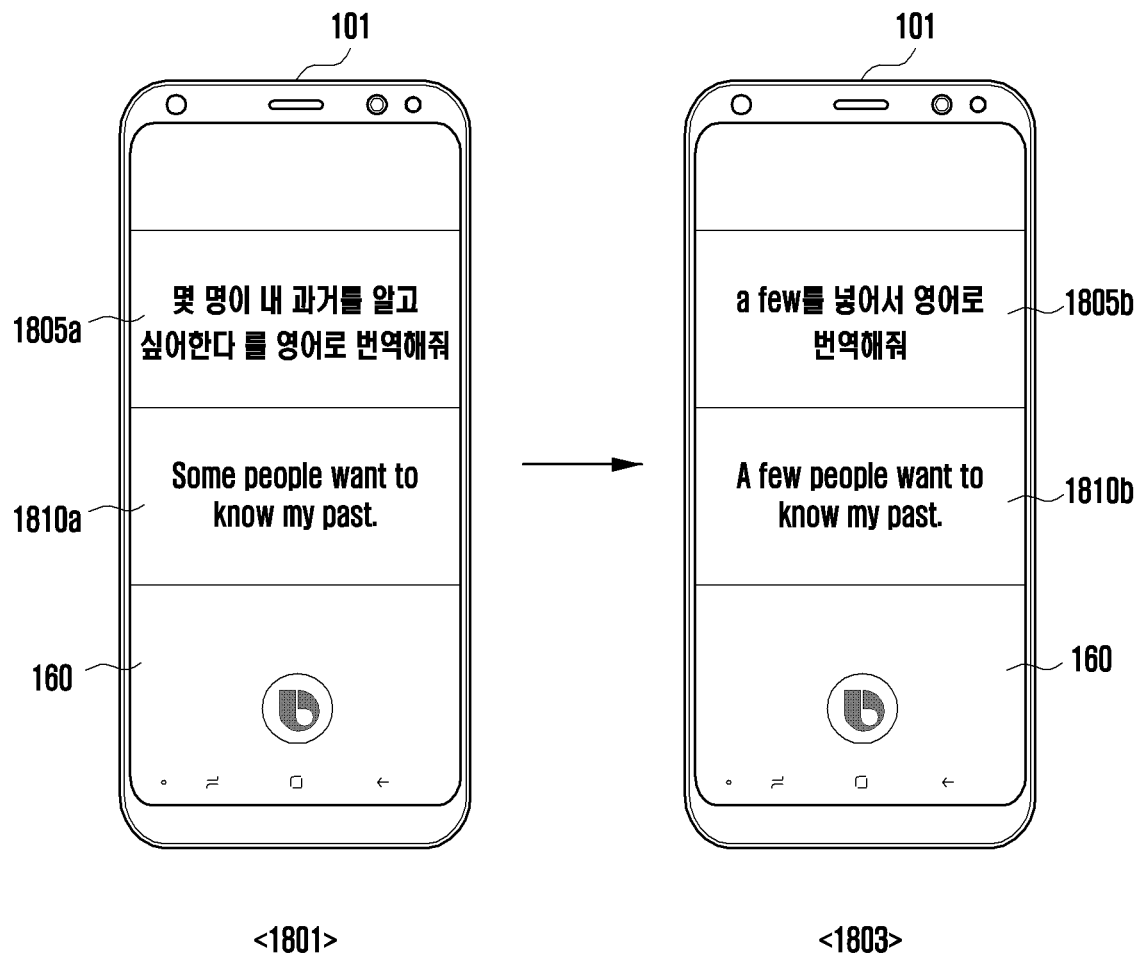
FIG. 18 is a diagram illustrating a translation result of an electronic device according to an embodiment of the disclosure.

FIG. 18 is a diagram illustrating a translation result of an electronic device 101 according to an embodiment of the disclosure.

Referring to FIG. 18, in screen 1801, when the user enters an utterance input "몇 명이 내 과거를 알고 싶어한다-를 영어로 번역해줘([myeoch myeong-i nae gwageoleul algo sip-eohanda-leul yeong-eolo beon-yeoghaejwo])" (1805a) through the microphone of the electronic device 101, the electronic device 101 may convert the utterance input into text and display it on the display device 160, and display the translation result "some people want to know my past" (1810a) and/or output it in speech.

In screen 1803, the user may include and/or limit a specific word in the translation result of "몇 명이 내 과거를 알고 싶어한다([myeoch myeong-i nae gwageoleul algo sip-eohanda])" (1805b). When the user enters an utterance input "a few 를 넣어서 영어로 번역해줘([a few-leul neoh-eoseo yeong-eolo beon-yeoghaejwo])" through the microphone of the electronic device 101, the electronic device 101 may convert the utterance input into text and display it on the display device 160, and display the translation result "a few people want to know my past" (1810b) and/or output it in speech. The electronic device 101 according to various embodiments may reflect a target word and/or a specific word in a translation result based on a translation factor obtained through an input. For example, the electronic device 101 may determine 'a few' as a translation factor and reflect this in the translation result.

Figure 19:
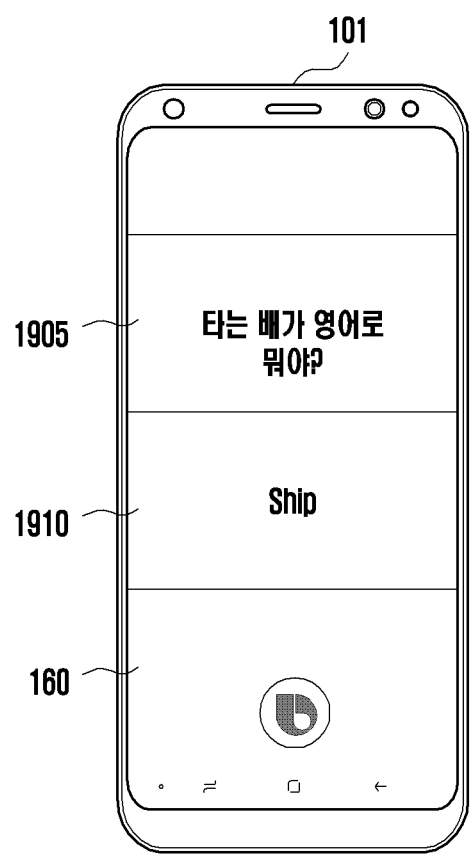
FIG. 19 is a diagram illustrating a translation result of an electronic device according to an embodiment of the disclosure.

FIG. 19 is a diagram illustrating a translation result of an electronic device according to an embodiment of the disclosure.

Referring to FIG. 19, in various embodiments, the user at a grocery store may enter an utterance input "타는 배가 영어로 뭐야? ([taneun baega yeong-eolo mwoya]?)" through the microphone of the electronic device 101. The electronic device 101 may convert the utterance input into text data and display it in an input display region 1905 included in the screen. The electronic device 101 may determine translation text data among the text data. The translation text data may be a polysemous word. For example, when ' 배([bae])' is determined as the translation text data, ' 배([bae])' may be a polysemous word having meanings of 'ship' and 'pear' in English being the target language. The electronic device 101 may collect surroundings data 1920 including the user's location by using the communication module (e.g., communication module 190 in FIG. 1). For example, the electronic device 101 may collect GPS coordinates '37.466577.126.626619' and/or POI information 'XX grocery store' as surroundings data. The electronic device 101 may generate a surroundings factor based on the surroundings data, and determine at least one keyword (e.g., 'XXgrocery store', 'grocery store', 'food') related to the surroundings factor. The electronic device 101 may generate ' 타는([taneun], riding)' as a translation factor.

In various embodiments, the electronic device 101 may determine the usage association of keywords 'grocery store' and/or 'food', translation factor ' 타는([taneun], riding)', and candidate words 'ship' and 'pear', and may display 'ship' having the highest usage association in a result display region 1910. The electronic device 101 may also output the translation result through the speaker (e.g., sound output device 155 in FIG. 1).

The electronic device 101 according to various embodiments may increase the accuracy of a translation result by using collected surroundings data and/or a translation factor when performing translation on the user input including a polysemous word.

Figure 20:
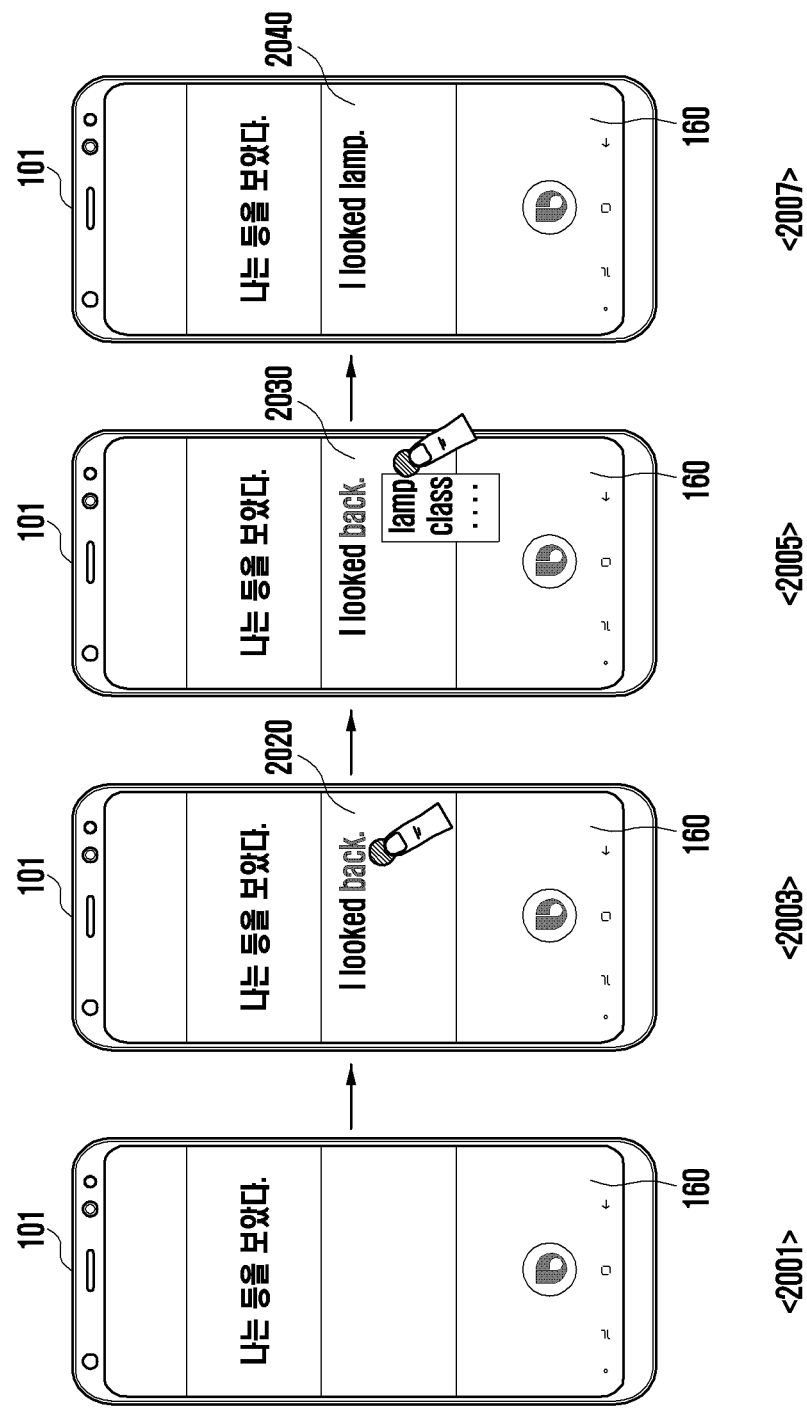
FIG. 20 is a diagram illustrating a translation result of an electronic device according to an embodiment of the disclosure.

FIG. 20 is a diagram illustrating a translation result of an electronic device according to an embodiment of the disclosure.

Referring to FIG. 20, in screen 2001, when the user enters an utterance input " 나는 등을 보았다([naneun deung-eul boassda])" through the microphone of the electronic device 101, the electronic device 101 may convert the utterance input into text and display it on the display device 160.

For reference, " 나는([naneun])" in Korean may mean "I" in English, and " 보았다([boassda])" in Korean may be "looked" in English. " 등([deung])" in Korean is a homophonous or polysemous word that may mean "back", "lamp", "class", or "etc." in English.

In screen 2003, when the user enters an utterance input " 나는 등을 밀었다([naneun deung-eul mil-eossda])" through the microphone of the electronic device 101, the electronic device 101 may display the translation result "I looked back" and/or output it in speech. Here, 'back' may be displayed in a highlighted form (2020) so as to indicate that it is a homophonous or polysemous word, and the user may select this. For instance, when translating a polysemous word, the electronic device 101 may be unable to determine a surroundings factor and/or a translation factor. For example, there may be no collected surroundings data, or no translation factor may be determined from the user input. As another example, although surroundings data is collected, if the usage association analysis determines only values lower than the threshold (e.g., 0.5), the electronic device 101 may not determine one translation result. In this case, the electronic device 101 may provide all translation results corresponding respectively to plural meanings to the user. For example, 'back', 'lamp', 'class', and 'etc.', which are translation results for the plural meanings of ' 등', may all be provided. The electronic device 101 may provide plural translation results to the user in the form of a list. Among them, a translation result (e.g., 'back') corresponding to the candidate word having the highest usage association may be located at the top and displayed as the result.

In screen 2005, when the translation result is displayed as "I looked back" on the display device 160 and the user selects 'back' on the screen, the electronic device 101 may display a list 2030 including "lamp", "class", and "etc.", which are language candidates that can replace 'back', on the display device 160, and the user may select one of the candidates.

In screen 2007, when the user selects "lamp" among language candidates "lamp", "class", "etc." that can replace 'back', the displayed translation result "I looked back" may be changed to "I looked lamp" 2040. The electronic device 101 may store 'lamp' as a user selection for ' 등' in the database (e.g., database 250 in FIG. 2, database 350 in FIG. 3, or database 460 in FIG. 4).

Figure 21:
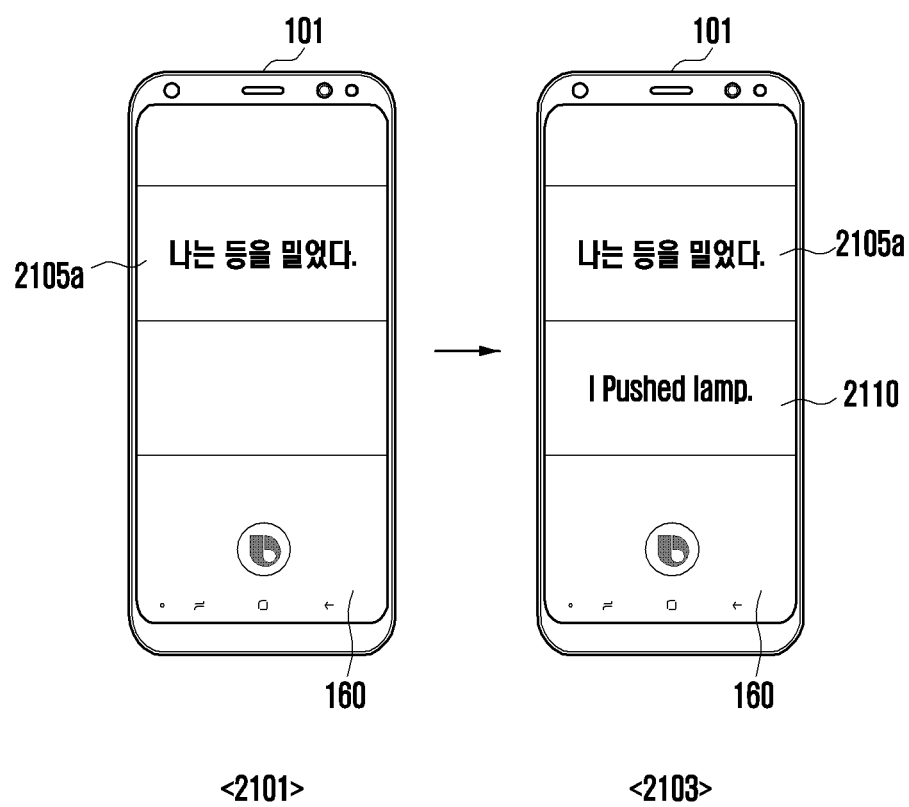
FIG. 21 is a diagram illustrating a translation result of an electronic device according to an embodiment of the disclosure.

FIG. 21 is a diagram illustrating a translation result of an electronic device according to an embodiment of the disclosure.

Referring to FIG. 21, the electronic device 101 may have stored 'lamp' in the database 250 or 350 as history data for Korean ' 등'. In screen 2101, when the user enters an utterance input " 나는 등을 보았다([naneun deung-eul mil-eossda])" (2105*a*) through the microphone of the electronic device 101, the electronic device 101 may convert the utterance input into text and display it on the display device 160.

" 등(deung)" in Korean is a homophonous or polysemous word that may mean "back", "lamp", "light", "class", or "etc." in English.

The electronic device 101 may limit the meaning of " 등(deung)" based on history data for translation. Here, the meaning of " 등([deung])" may be translated into "lamp", which is stored in the history data.

In screen 2103, the electronic device 101 may display "I pushed lamp" (2110), which is a translation result based on the history data, and/or output it in speech.

It should be understood that the various embodiments of the present document and the terminology used therein are not intended to limit the techniques described herein to specific embodiments but to include various modifications, equivalents, or alternatives thereof. In the drawings, similar reference symbols may be used to refer to the similar or related parts. The singular form of a noun corresponding to an item may include one or multiple instances of the item unless clearly indicated otherwise in a related context. In the present document, the expression "A or B", "at least one of A and B", "at least one of A or B", "A, B or C", "at least one of A, B and C", or "at least one of A, B or C" may include any one of the listed items or all possible combinations thereof. The terms "1$^{st}$" "2$^{nd}$" or "first" and "second" may be used to simply distinguish one element from another element, without limiting corresponding elements in another aspect (e.g., importance or order). It will be understood that when an element (e.g., first element) is referred to as being "coupled with/to" or "connected with/to" another element (e.g., second element) with/without a term "operatively" or "communicatively", it can be coupled or connected with/to the other element directly (e.g., wiredly), wirelessly, or via a third element.

The term "module" used in the present document may include a certain unit that is implemented in hardware, software, or firmware, and may be used interchangeably with the term "logic", "logical block", "component", or "circuit", for example. The module may be the minimum unit or a part of a single-bodied component, which performs one or more particular functions. For example, in one embodiment, a module may be implemented in the form of an application-specific integrated circuit (ASIC).

Various embodiments of the present document may be implemented in software (e.g., programs 140) including one or more instructions stored in a machine-readable storage medium (e.g., internal memory 136 or external memory 138) readable by a machine (e.g., electronic device 101). For example, the processor (e.g., processor 120) of the machine (e.g., electronic device 101) may invoke and execute at least one of the one or more instructions stored in the storage medium. This enables the machine to be operated to perform at least one function according to the invoked at least one instruction. The one or more instructions may include a code generated by a compiler or a code executable by an interpreter. The machine-readable storage medium may be provided in the form of a non-transitory storage medium. Here, the term 'non-transitory' means that the storage medium is a tangible device and does not include a signal (e.g., electromagnetic wave), but it does not distinguish whether data is stored semi-permanently or temporarily in the storage medium.

In one embodiment, the method according to various embodiments disclosed herein may be provided as being included in a computer program product. A computer program product may be traded between a seller and a purchaser as a commodity. A computer program product may be distributed in the form of a machine-readable storage medium (e.g., compact disc read only memory (CD-ROM)), or may be distributed online (e.g., download or upload) directly between two user devices (e.g., smartphones) or through an application store (e.g., PlayStore™). In the case of on-line distribution, at least a portion of the computer program product may be temporarily stored or temporarily created in a machine-readable storage medium such as a memory of a manufacturer's server, an application store's server, or a relay server.

According to various embodiments, each of the components (e.g., modules or programs) described above may include singular or plural entities. In various embodiments, one or more components or operations may be omitted from the corresponding components described above, or one or more different components or operations may be added. Alternatively or additionally, plural components (e.g., modules or programs) may be combined into one component. In this case, the combined component may perform one or more functions identical or similar to those of the plural components before combination. According to various embodiments, operations performed by a module, program, or another component may be carried out in sequence, in parallel, by repetition, or heuristically, and one or more of the operations may be executed in a different order or may be omitted, or one or more different operations may be added.

What is claimed is:

1. An electronic device comprising:
   one or more sensors;
   at least one processor; and
   memory storing instructions that, when executed by the at least one processor, cause the electronic device to:
   receive an input,
   based on the input, generate a translation factor used for limiting a meaning of a word to be translated,
   in response to receiving the input, collect data regarding a surrounding environment of the electronic device by using the one or more sensors,
   based on the collected data, generate a surrounding environment factor,
   determine plural candidate words to be translated,
   determine a first usage association of each of the plural candidate words, the first usage association including a correlation between the translation factor and each of the plural candidate words,
   based on the correlation, determine a candidate word having a highest correlation value,
   translate the determined candidate word and the input, the translating of the input including changing at least one first word corresponding to the input to at least one second word related to the at least one first word, the changing of the at least one first word including adjusting a difficulty level of a result of translating the at least one first word based on the translation factor, and
   output a translation result of the input through at least one of a display or a speaker of the electronic device.

2. The electronic device of claim 1, wherein the instructions, when executed by the at least one processor, further cause the electronic device to:
   determine a keyword based on the surrounding environment factor,
   determine a second usage association of each of the plural candidate words based on the keyword, the second usage association including a correlation between the keyword and each of the plural candidate words,
   based on the second usage association, determine the candidate word having the highest correlation value, and
   translate the determined candidate word.

3. The electronic device of claim 2, wherein the instructions, when executed by the at least one processor, further cause the electronic device to:
   in case that the second usage association of each of the plural candidate words is less than a threshold value, translate all the plural candidate words, and
   provide translation results of the translating of all the plural candidate words.

4. The electronic device of claim 3, wherein the instructions, when executed by the at least one processor, further cause the electronic device to:
   based on the surrounding environment factor, change a difficulty level of a translation result, and
   after changing the difficulty level of the translation result, provide the translation result.

5. The electronic device of claim 1, wherein the instructions, when executed by the at least one processor, further cause the electronic device to:
   based on the translation factor, change a difficulty level of a translation result, and
   after changing the difficulty level of the translation result, provide the translation result.

6. The electronic device of claim 1, wherein the instructions, when executed by the at least one processor, further cause the electronic device to:
   determine a keyword based on the surrounding environment factor,
   determine a third usage association of each of the plural candidate words based on the keyword, the third usage association including a correlation between the keyword and each of the plural candidate words,
   determine a fourth usage association of each of the plural candidate words based on the translation factor, the fourth usage association including the correlation between the translation factor and each of the plural candidate words,
based on the third usage association and the fourth usage association, determine the candidate word having the highest correlation value, and
translate the determined candidate word.

7. A method for language translation, the method comprising:
receiving an input;
based on the input, generating a translation factor used for limiting a meaning of a word to be translated;
in response to receiving the input, collecting data regarding a surrounding environment of an electronic device by using one or more sensors of the electronic device;
based on the collected data, generating a surrounding environment factor;
determining plural candidate words to be translated;
determining a first usage association of each of the plural candidate word, the first usage association including a correlation between the translation factor and each of the plural candidate words;
based on the first usage association, determining a candidate word having a highest correlation value;
translating the determined candidate word and the input, the translating of the input including changing at least one first word corresponding to the input to at least one second word related to the at least one first word, the changing of the at least one first word including adjusting a difficulty level of a result of translating the at least one first word based on the translation factor; and
outputting a translation result of the input through at least one of a display or a speaker of the electronic device.

8. The method of claim 7, wherein the translating comprises:
determining a keyword based on the surrounding environment factor;
determining a second usage association of each of the plural candidate words based on the keyword, the second usage association including a correlation between the keyword and each of the plural candidate words;
based on the second usage association, determining the candidate word having the highest correlation value; and
translating the determined candidate word.

9. The method of claim 8, further comprising:
in case that the second usage association of each of the plural candidate words is less than a threshold value, translating all the plural candidate words and providing translation results of the translating of all of the plural candidate words.

10. The method of claim 9, further comprising:
based on the surrounding environment factor, changing a difficulty level of a translation result; and
after changing the difficulty level of the translation result, providing the translation result.

11. The method of claim 7, further comprising:
based on the translation factor, changing a difficulty level of a translation result; and
after changing the difficulty level of the translation result, providing the translation result.

12. The method of claim 7, wherein the translating comprises:
determining a keyword based on the surrounding environment factor;
determining a third usage association of each of the plural candidate words based on the keyword, the third usage association including a correlation between the keyword and each of the plural candidate words;
determining a fourth usage association of each of the plural candidate words based on the translation factor, the fourth usage association including the correlation between the translation factor and each of the plural candidate words;
based on the third usage association and the fourth usage association, determining the candidate word having the highest correlation value; and
translating the determined candidate word.

13. One or more non-transitory computer-readable storage media storing one or more programs including instructions that, when executed by one or more processors of a device, cause the device to perform operations, the operations comprising:
receiving an input;
based on the input, generating a translation factor used for limiting a meaning of a word to be translated;
in response to receiving the input, collecting data regarding a surrounding environment of the device by using one or more sensors of the device;
based on the collected data, generating a surrounding environment factor;
determining plural candidate words to be translated;
determining a first usage association of each of the plural candidate words, the first usage association including a correlation between the translation factor and each of the plural candidate words;
based on the first usage association, determining a candidate word having a highest correlation value;
translating the determined candidate word and the input, the translating of the input including changing at least one first word corresponding to the input to at least one second word related to the at least one first word, the changing of the at least one first word including adjusting a difficulty level of a result of translating the at least one first word based on the translation factor; and
outputting a translation result of the input through at least one of a display or a speaker of the device.

* * * * *